United States Patent
Das et al.

(10) Patent No.: US 11,030,448 B2
(45) Date of Patent: Jun. 8, 2021

(54) METHOD FOR RECOMMENDING ONE OR MORE ACTIONS AND AN ELECTRONIC DEVICE THEREOF

(71) Applicant: Samsung Electronics Co., Ltd., Suwon-si (KR)

(72) Inventors: Kaushik Das, Bangalore (IN); Bhanu Prakash Bomma, Bangalore (IN); Joy Bose, Bangalore (IN); Nikhil Sahni, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/129,193

(22) Filed: Sep. 12, 2018

(65) Prior Publication Data

US 2019/0080163 A1 Mar. 14, 2019

(30) Foreign Application Priority Data

Sep. 12, 2017 (IN) .............................. 201741032287

(51) Int. Cl.
*G06K 9/72* (2006.01)
*G06K 9/00* (2006.01)
(Continued)

(52) U.S. Cl.
CPC ......... *G06K 9/00463* (2013.01); *G06F 3/017* (2013.01); *G06F 3/0486* (2013.01);
(Continued)

(58) Field of Classification Search
CPC ............ G06K 9/00463; G06K 9/00456; A61B 5/742; A61B 5/4815; A61B 5/4809;
(Continued)

(56) References Cited

U.S. PATENT DOCUMENTS

| 9,002,725 B1 | 4/2015 | Carobus et al. |
| 2010/0131836 A1 | 5/2010 | Dukhon et al. |

(Continued)

FOREIGN PATENT DOCUMENTS

| KR | 10-2013-0124767 A | 11/2013 |
| KR | 10-2014-0045698 A | 4/2014 |

(Continued)

OTHER PUBLICATIONS

International Search Report dated Dec. 20, 2018, issued in the International application No. PCT/KR2018/010680.
(Continued)

*Primary Examiner* — Phuoc H Doan
(74) *Attorney, Agent, or Firm* — Jefferson IP Law, LLP

(57) ABSTRACT

A method of recommending one or more actions for a mobile device, and an apparatus therefor are provided. In an embodiment, a user may invoke an assistance item such as bulb that is present semi-transparent on a mobile screen and drag the bulb on one or more user selected regions on a mobile device screen. The assistance item is made operable by the user to encompass device contents from the one or more user selected regions. The bulb identifies one or more actionable items within the encompassed device contents and provides a visual indication of the identified actionable items. Thereafter, the bulb recognizes an inter-relationship between the identified one or more actionable items and provides at least one appropriate device application for
(Continued)

executing at least one task which involves the inter-relationship among the actionable items. A preferred application may be notified with an indication such as a red dot.

21 Claims, 38 Drawing Sheets

(51) Int. Cl.
    *G06F 3/01*       (2006.01)
    *G06F 3/0484*    (2013.01)
    *G06F 3/0486*    (2013.01)
    *G06F 3/0481*    (2013.01)
    *G06F 3/0488*    (2013.01)
    *G06K 9/22*      (2006.01)
    *G06K 9/62*      (2006.01)

(52) U.S. Cl.
    CPC ...... *G06F 3/04817* (2013.01); *G06F 3/04842* (2013.01); *G06F 3/04883* (2013.01); *G06K 9/00355* (2013.01); *G06K 9/00456* (2013.01); *G06K 9/22* (2013.01); *G06K 9/6253* (2013.01)

(58) Field of Classification Search
    CPC ..... G06Q 50/12; H04W 4/008; G01L 5/0028; H02J 7/025; H04N 21/4722
    USPC .......... 382/103, 131, 190; 725/43, 53; 702/3
    See application file for complete search history.

(56) References Cited

U.S. PATENT DOCUMENTS

| | | |
|---|---|---|
| 2013/0298162 A1* | 11/2013 | Cho ................. H04N 21/23418 725/43 |
| 2013/0329023 A1 | 12/2013 | Suplee, III et al. |
| 2014/0035826 A1 | 2/2014 | Frazier et al. |
| 2014/0101617 A1 | 4/2014 | Yang et al. |
| 2014/0337800 A1 | 11/2014 | Gray et al. |
| 2015/0066643 A1 | 3/2015 | Choi et al. |
| 2015/0212996 A1 | 7/2015 | Plante et al. |
| 2015/0237082 A1 | 8/2015 | Duong et al. |

FOREIGN PATENT DOCUMENTS

| | | |
|---|---|---|
| KR | 10-2014-0101270 A | 8/2014 |
| KR | 10-2017-0059652 A | 5/2017 |

OTHER PUBLICATIONS

European Search Report dated Aug. 14, 2020; European Application No. 18856087.4-1203 /3665557 PCT/KR2018010680.

Indian Office Action dated Oct. 22, 2020; Indian Appln. No. 201741032287.

\* cited by examiner

METHOD FOR RECOMMENDING ONE OR MORE ACTIONS AND AN ELECTRONIC DEVICE THEREOF

CROSS-REFERENCE TO RELATED APPLICATION(S)

This application is based on and claims priority under 35 U.S.C. § 119 of an Indian patent application number 201741032287, filed on Sep. 12, 2017, in the Indian Intellectual Property Office, the disclosure of which is incorporated by reference herein in its entirety.

BACKGROUND

1. Field

The disclosure relates to mobile communications. More particularly, the disclosure relates to a method for recommending one or more actions and an electronic device thereof.

2. Description of Related Art

With the huge development in mobile technology and in the mobile operating systems, people tend to use numerous applications for performing one or more functions in a simpler manner. Also, with the widespread adoption of the Internet, a user may explore 'N' number of applications suitable for performing a task. For example, a user can download an application for managing profile of a mobile device in an effective manner. On the application developing side, developers also understand the behavior of the user and upgrade the application as per user usage periodically. Nowadays, user interaction with a mobile application by means of typing/touches got reduced and other means of interactions such as gestures, virtual assistants etc. are getting popular.

The virtual assistant is configured to understand the user needs and acts like a person in interacting with the mobile device. This provides the user an experience similar to interacting with another person rather a machine. The virtual assistant allows the user to interact with the mobile device using voice commands. The virtual assistant understands the voice commands of the user extract the essential information from the voice command and access the relevant one or more applications and provides the result/feedback to the user accordingly. Thus, the virtual assistants are made intelligent enough to understand voice of the user to execute any function. Since, the interactions are performed using voice commands, the frequency of using such virtual assistants are not encouraged by the users in all situations.

Currently, there exists no method to extract the information in one or more applications and present the extracted information visually to the user in a customized form that allows users to interact in a meaningful way while executing one or more activities based on the retrieved information.

Therefore, there is a need for a method to extract information in a content and present the extracted information intelligently to the user.

The above-mentioned shortcomings, disadvantages and problems are addressed herein and which will be understood by reading and studying the following specification.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for recommending one or more actions and an electronic device thereof.

Additional aspects will be set forth in part in the description which follows and, in part, will be apparent from the description, or may be learned by practice of the presented embodiments.

In accordance with an aspect of the disclosure, an application recommendation method is provided. The method includes invoking, by a user, an assistance item on one or more user selected regions on a display of an electronic device, where the assistance item is operable by the user to encompass a plurality of device contents from the one or more user selected regions, identifying, by a user interface, one or more actionable items within the encompassed plurality of device contents, providing a visual indication of the identified actionable items, identifying an inter-relationship between the identified one or more actionable items, and providing at least one of selecting an actionable item among the one or more actionable items, performing an action on the identified one or more actionable items, triggering at least one device application appropriate for executing the action on the identified one or more actionable items, or operating on the identified one or more actionable items based on the identified inter-relationship among the actionable items.

According to an aspect of the disclosure, the encompassed plurality of device contents comprises at least one of texts, numbers, symbols, images, or icons displayed on the display of the electronic device.

According to an aspect of the disclosure, the one or more actionable items comprises at least one of a phone number, an address, an email address, an email id, a uniform resource locator (URL), a trade name, an account number, or an image within the encompassed plurality of device contents.

According to an aspect of the disclosure, the user can deselect one or more previously selected regions, and the one or more actionable items identified by the user are dynamically updated.

According to an aspect of the disclosure, the user can edit, update or delete the one or more user actionable items identified by the user from the one or more selected regions.

According to an aspect of the disclosure, the indicia is invoked by providing at least one of a touch gesture, a drag gesture, a double tap gesture, a voice command, or a long press gesture.

According to an aspect of the disclosure, the method further includes providing one or more recommendations associated with the at least one device application to the user for executing the task, wherein the one or more recommendations are provided based on user preferences, past activity history and planned future activities of the user.

According to an aspect of the disclosure, the method further includes storing the at least one device application as one or more user actionable entities in the mobile device.

According to an aspect of the disclosure, the one or more user actionable items, application recommendations and user actionable entities are provided to a user in a different language from the original entity and stored in a language independent format in the electronic device.

According to an aspect of the disclosure, the method further includes providing a user interface for viewing the stored one or more user actionable entities in the mobile device, dynamically updating the stored one or more user actionable entities viewed in the user interface, and invoking at least one of the stored one or more user actionable entities by providing at least one of a voice command with keywords, an id of the stored entity, a category of the stored entity, or a selection menu.

According to an aspect of the disclosure, the method further includes extracting common or differential intelligence parameters from at least two or more of the actionable items, based on one or more of metadata, contents and properties associated with the at least two or more actionable items, and generating a new user actionable entity based on the extracted common or differential intelligence parameters.

According to an aspect of the disclosure, the method further includes comparing one or more parameters associated with at least two or more actionable entities, and generating a merged user actionable entity based on the comparison of at least two or more actionable items.

According to an aspect of the disclosure, the method further includes recommending, by the user, two or more actionable entities for merging, wherein parameters in the two or more actionable entities are compared to recommend two or more of the actionable items to be merged.

Various embodiments herein further describe a user device to receive recommendation of one or more applications to perform one or more tasks. According to an aspect of the disclosure, the electronic device comprises at least one processor, a memory coupled to the at least one processor, and a user interface. The at least one processor is configured to control the user interface to receive an assistance item on one or more user selected regions on a display of the electronic device, wherein the assistance item is operable by a user to encompass a plurality of device contents from the one or more user selected regions, identify one or more actionable items within the encompassed plurality of device contents, provide a visual indication of the identified actionable items, identify an inter-relationship between the identified one or more actionable items, and provide at least one of a selection of an actionable item among the one or more actionable items, an action to be performed on the identified one or more actionable items, a trigger for at least one device application appropriate for executing the action on the identified one or more actionable items, or an operation on the identified one or more actionable items based on the identified inter-relationship among the actionable items.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

Throughout the drawings, like reference numerals will be understood to refer to like parts, components, and structures.

DETAILED DESCRIPTION

Figure 1:
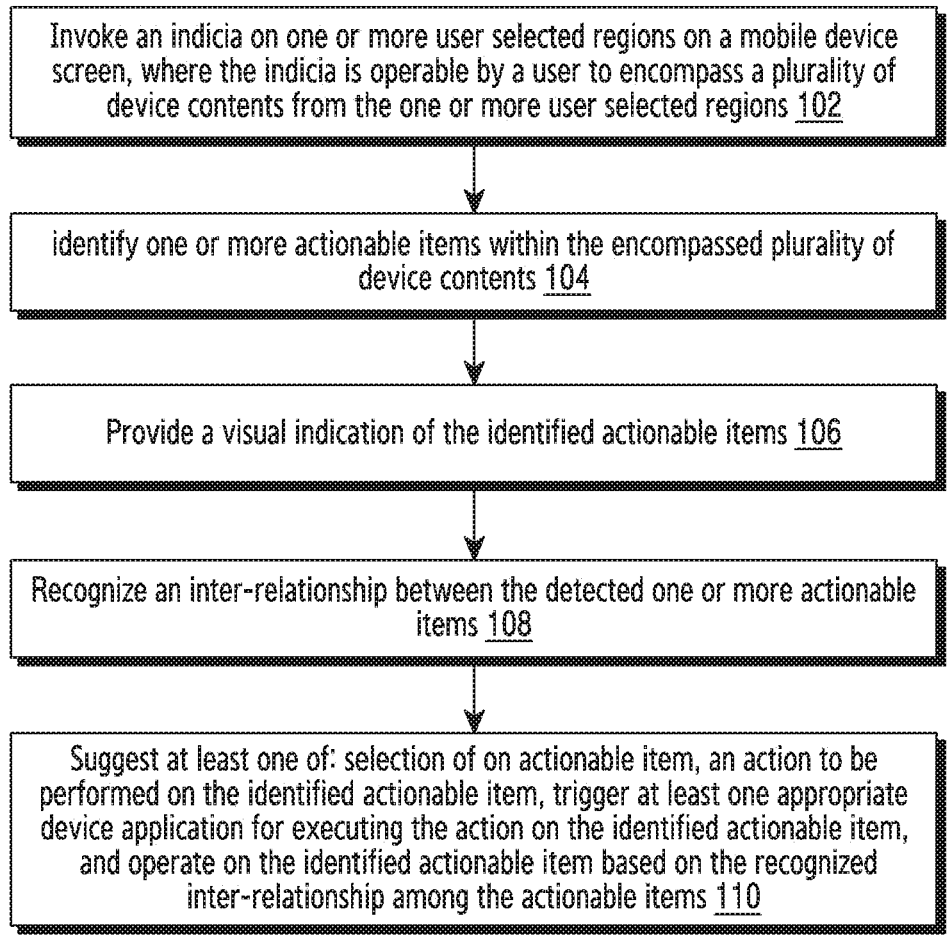
FIG. 1 is a flow chart diagram illustrating series of operations involved in an application recommendation method for a mobile device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The disclosure describes a method of recommending one or more actions for a mobile device. The application recommendation method enables a user of the mobile device to perform one or more tasks intelligently using one or more application recommendations. In one embodiment, the disclosure describes use of an indicia that when invoked by a user on one or more user selected regions, encompasses plurality of device content present in the one or more user selected regions. The indicia also identify one or more actionable items in the encompassed plurality of device contents and recommend one or more device application to perform one or more functions associated with the one or more actionable items. For example, the indicia may be an assistance item and the assistance item may be item that recommends the user the information needed by identifying the information on the mobile device screen. The user may press on the assistance item and drag the assistance item over one or more regions on the mobile device screen. In response to the drag gesture, the assistance item may encompass plurality of device contents present in the one or more user selected regions. The one or more user selected regions are associated with any application present in the mobile device such as message, contacts, email, gallery and so on.

FIG. 1 is a flow chart diagram illustrating series of operations involved in recommending one or more actions for a mobile device, according to an embodiment of the disclosure.

The step by step procedure in recommending an application to the user is explained herein as follows. At operation 102, an indicia is invoked by the user on one or more user selected regions on a mobile device screen. The user may invoke the indicia by providing a touch/tap gesture on the indicia. Initially, the indicia look semi-transparent on the mobile device screen. Upon receiving the touch/tap gesture, the indicia become fully visible on the mobile device screen. In one embodiment, the indicia is represented as an image and it can be of any form, size, color etc. The user then provides a long press on the indicia and drags the indicia over one or more regions on the mobile device screen. In response to the drag gesture, the indicia encompass plurality of device contents present in the one or more user selected regions. At operation 104, one or more actionable items present within the plurality of device contents are identified and the identified one or more actionable items are visually indicated on the mobile screen at operation 106. The user can also edit the one or more actionable items according to his choice. Then, at operation 108, an inter-relationship between the identified one or more actionable items are recognized. The recognition of the one or more actionable items results in execution of at least one function associated with the one or more actionable items. Therefore, at operation 110, at least one appropriate device application is suggested for executing at least one function which involves the inter-relationship among the actionable items. The same is illustrated in FIG. 1.

FIGS. 2A to 2F are schematic diagrams illustrating series of operations involved in recommending an appropriate application for a message received by a user, according to various embodiments of the disclosure.

Figure 2A:
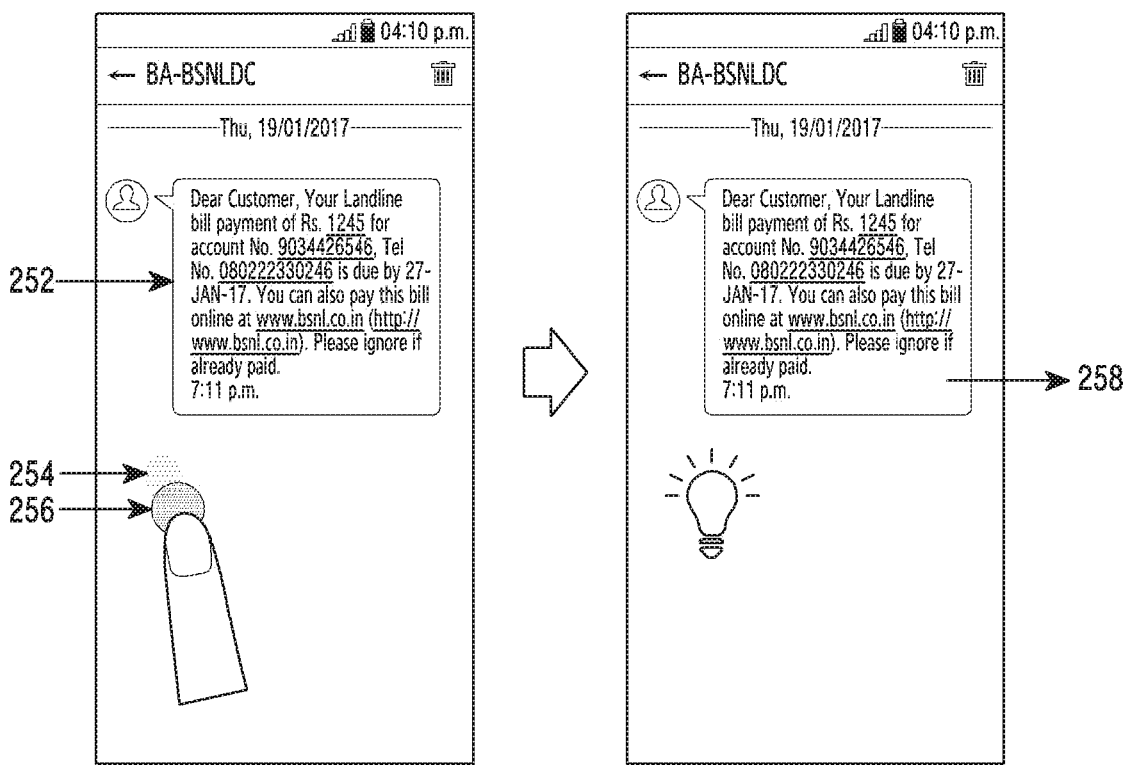
FIGS. 2A, 2B, 2C, 2D, 2E, and 2F are schematic diagrams illustrating series of operations involved in recommending an appropriate application for a message received by a user, according to various embodiments of the disclosure.
Figure 2B:
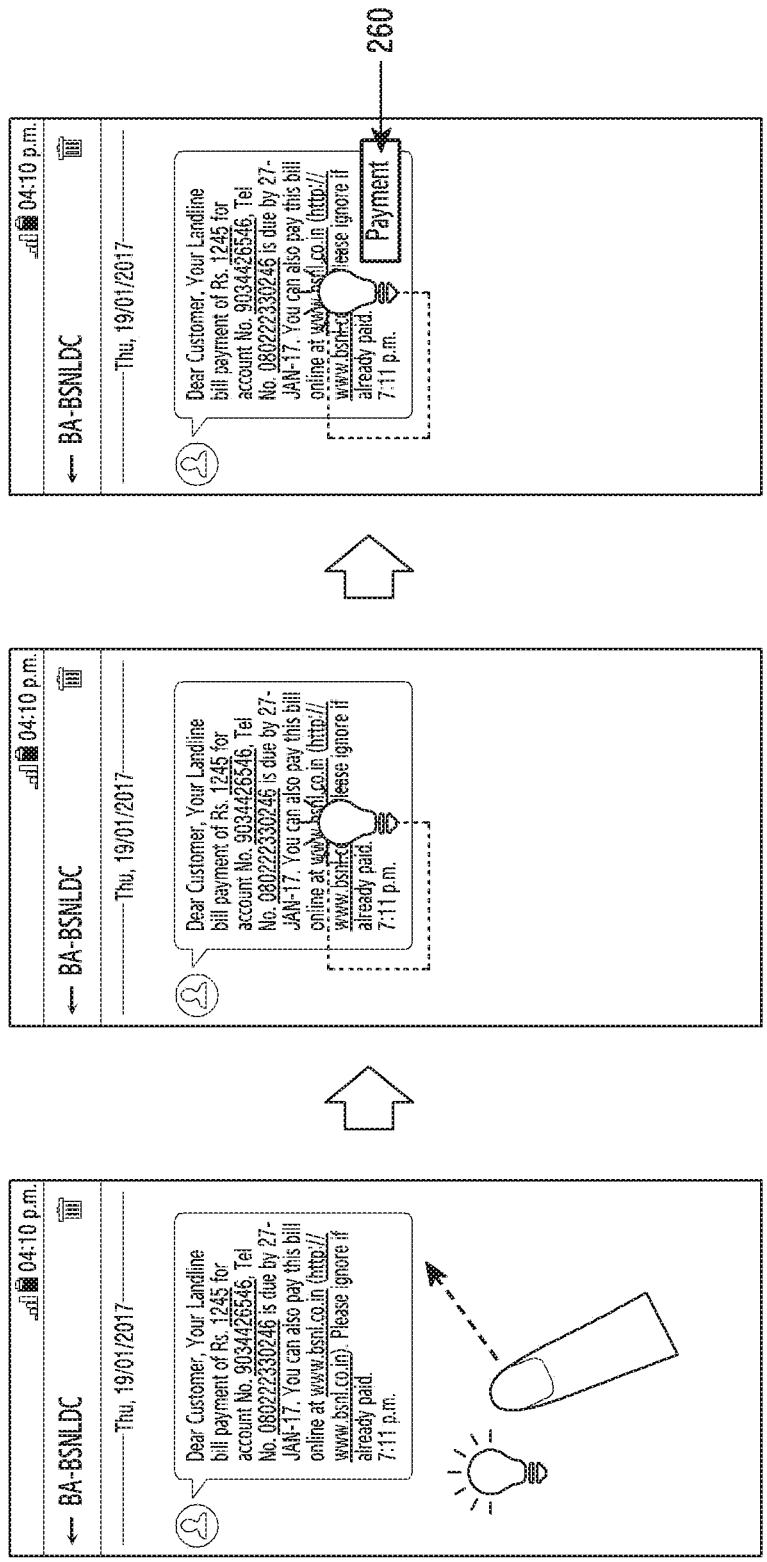
Figure 2C:
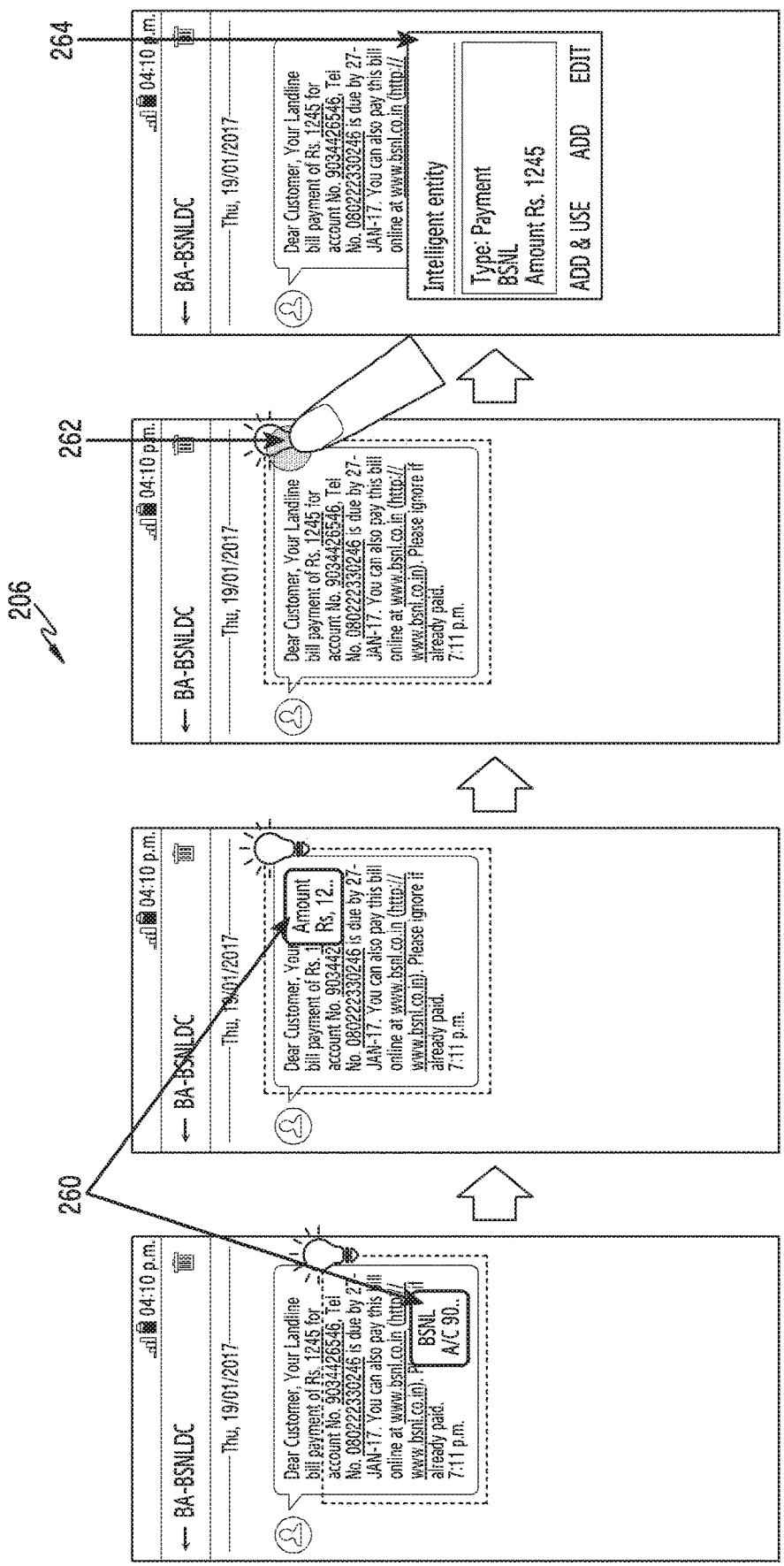
Figure 2D:
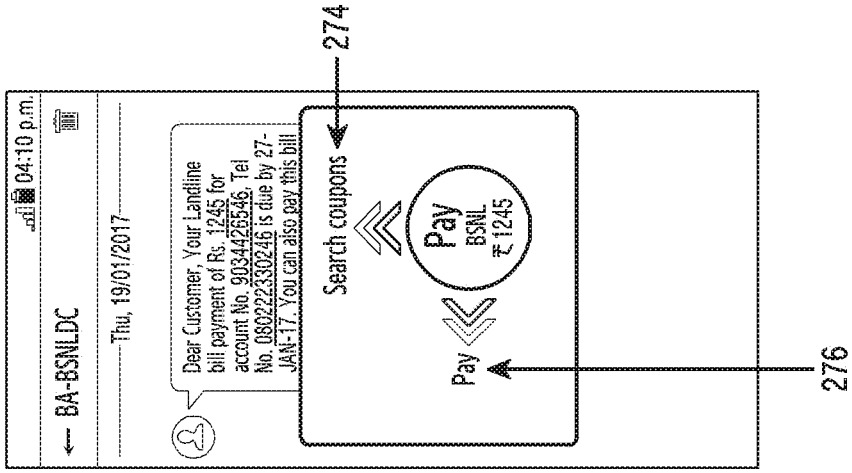
Figure 2D:
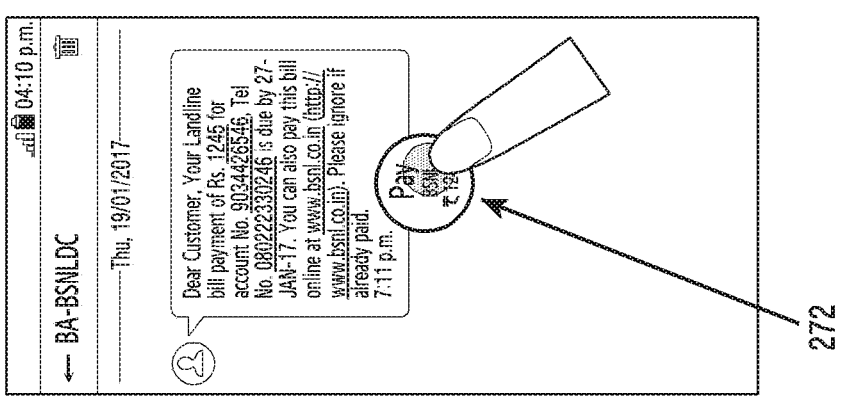
Figure 2D:
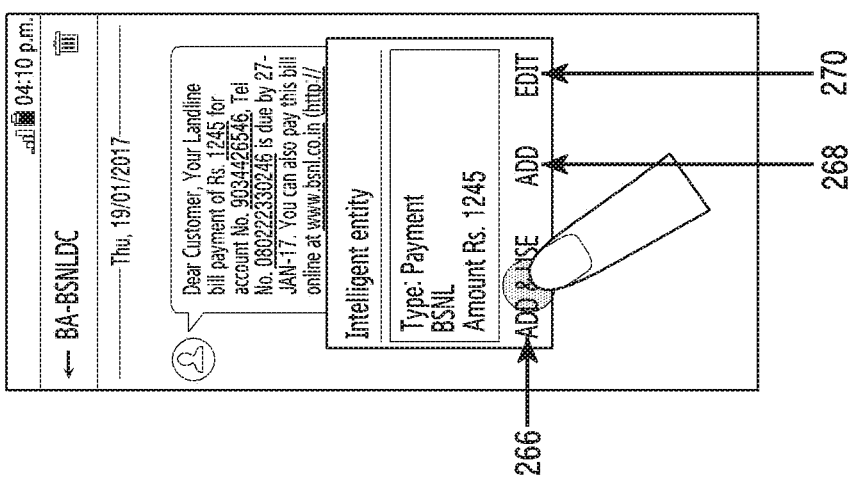

In this embodiment, consider that a user has received his mobile bill as a message 252 via a messaging application. The received message displays information such as phone number, amount to be paid, due date, URL for making payment etc. on a mobile screen. The disclosure displays an indicia such as a 'bulb' 254 below the message on the messaging application. As shown in FIG. 2A, the bulb remains semi-transparent on the mobile screen and when a user provides a tap gesture 256 on the bulb, the bulb glows and properly appears on the mobile screen 258. This is performed at operation 202.

In one embodiment, the user long presses on the bulb 254 and drags the bulb 254 across the message 252 being displayed on the mobile screen 258. When the user performs the drag operation, the bulb 254 intelligently identifies one or more actionable items 260 present in the message 252. Some of the actionable items 260 correspond to at least one of payment, social media, travel, shopping, multimedia, settings, amount and the like. In the above example, the one or more actionable items present in the message comprises of 'payment', 'BSNL A/C no', 'amount', 'phone number' etc. These identified one or more actionable items 260 are visually indicated to the user. The visual indication also includes a change in color and intensity of the bulb 254 for the different actionable items 260 being identified. This is performed at operation 204.

Once the one or more actionable items 260 are identified, the bulb 254 outlines the message in dotted lines and appears at right corner of the outlined message. The user then provides a double tap gesture 262 on the bulb 254. In response, the bulb 254 recognizes inter-relationship between the identified one or more actionable items 260. The bulb 254 then displays a user actionable entity 264 based on the inter-relationship recognized between the one or more actionable items 260. The user actionable entity 264 is displayed as a pop-up box along with one or more options to the user on the mobile device screen 258. This is performed at operation 206.

The one or more options are i) ADD & USE 266, ii) ADD 268 and iii) EDIT 270. The option 'ADD' 268 allows a user to create a new entry of an actionable entity that can be viewed in a user interface element. The user interface element is a place where all the created user actionable items and its associated tasks are stored and displayed for future use. In the above example, the ADD option 268 creates a new entry under payment item. The option 'ADD & USE' 266 allows a user to create an entity and store it for later usage. The option 'EDIT' 270 allows the user to edit one or more actionable items being created. However, it is to be noted that the options may vary based on the created actionable entity. In one operation, consider that the user has selected the option—ADD & USE 266 for the payment entity 264 being created. In response, the newly created payment entity will be displayed to the user as 'pay BSNL Rs 1245'. When the user long presses on the newly created payment entity 272, the newly created payment entity 272 displays one or more options associated with the payment entity 272. For the above example, the options 'Search coupons' 274 and 'Pay' 276 will be displayed to the user. The same is performed at operation 208.

Figure 2E:
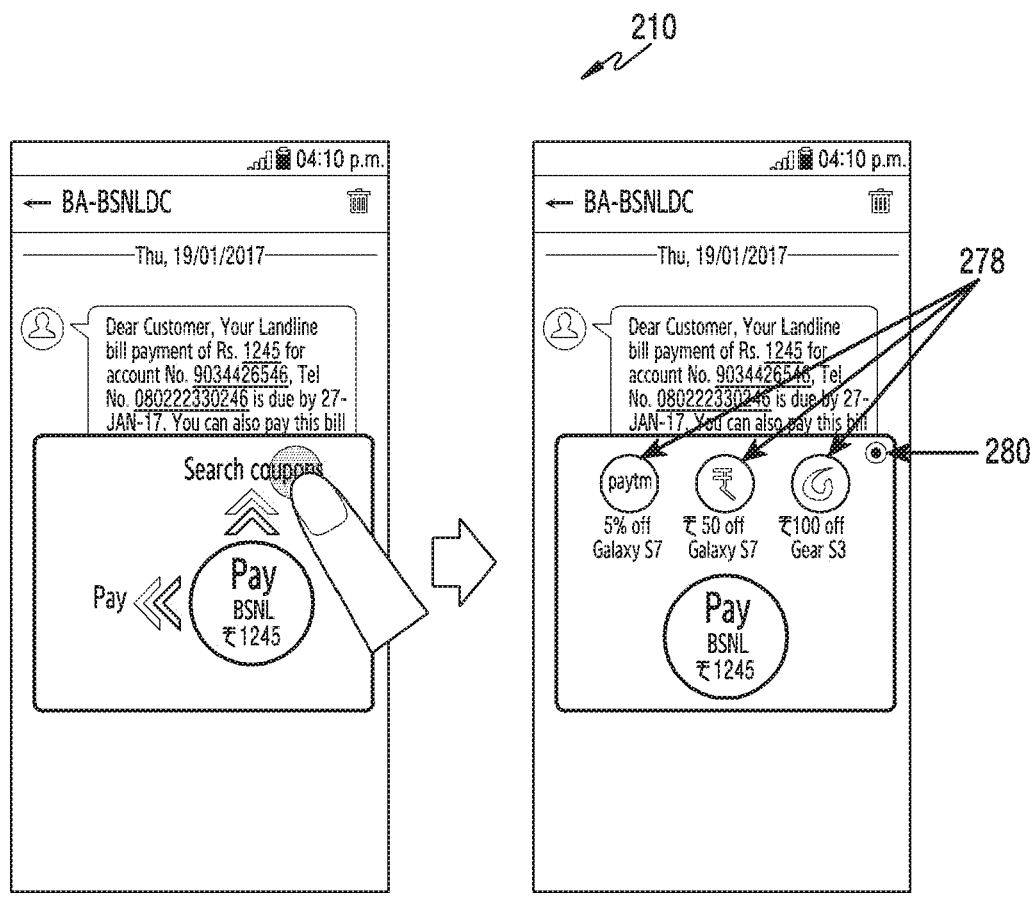
Figure 2F:
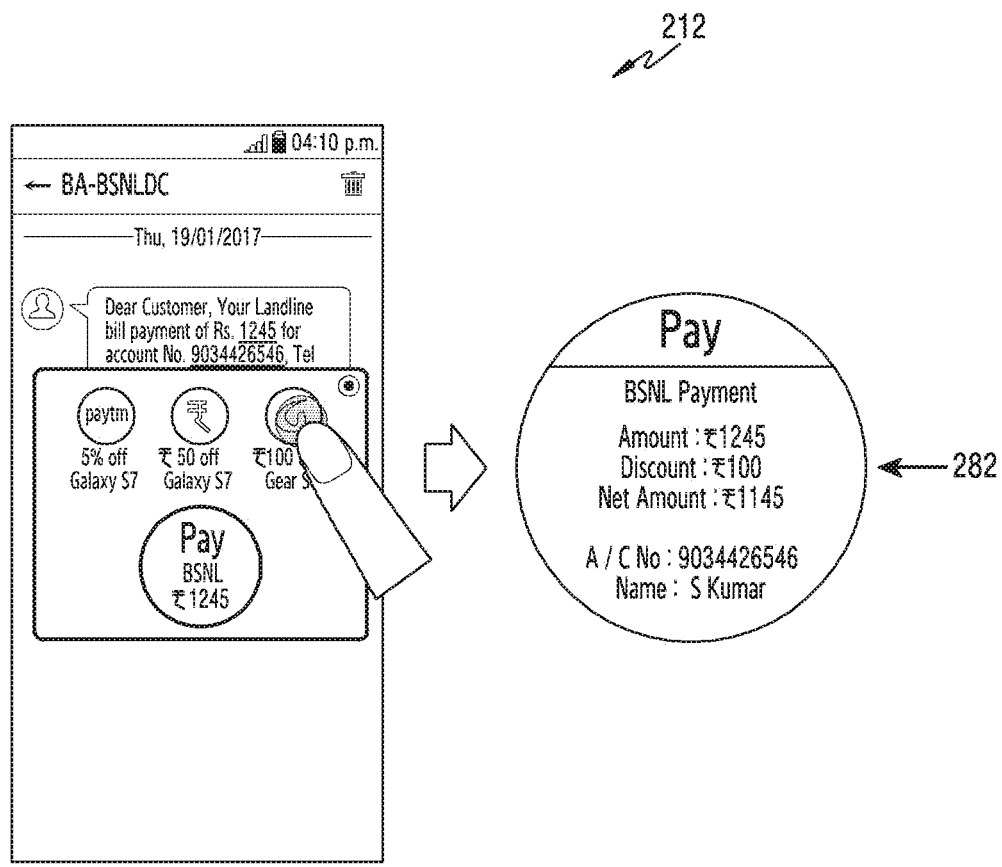

If the user drags towards 'Search coupons' option 274, the payment entity 272 retrieves possible applications with coupons 278 for the mobile bill payment and lists the most preferred application 280 with an indication such as red dot on the coupon. The same is illustrated in FIG. 2E of operation 210. The user may then select the most preferred application and proceed to make the payment after the discount. The final payment entity 282 will then be displayed to the user as shown in FIG. 2F of operation 212. In case, if the user selects the option 'pay' 276, the payment entity 272 directs the user to BSNL bill payment webpage to make the payment.

Figure 3A:
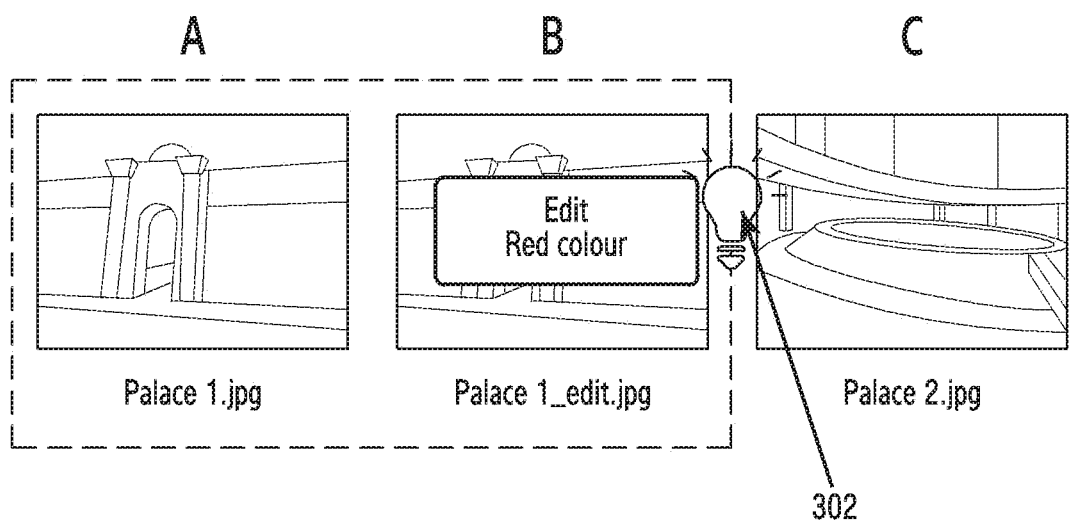
FIGS. 3A and 3B are schematic diagrams illustrating a series of operations performed in a gallery application, according to various embodiments of the disclosure.
Figure 3B:
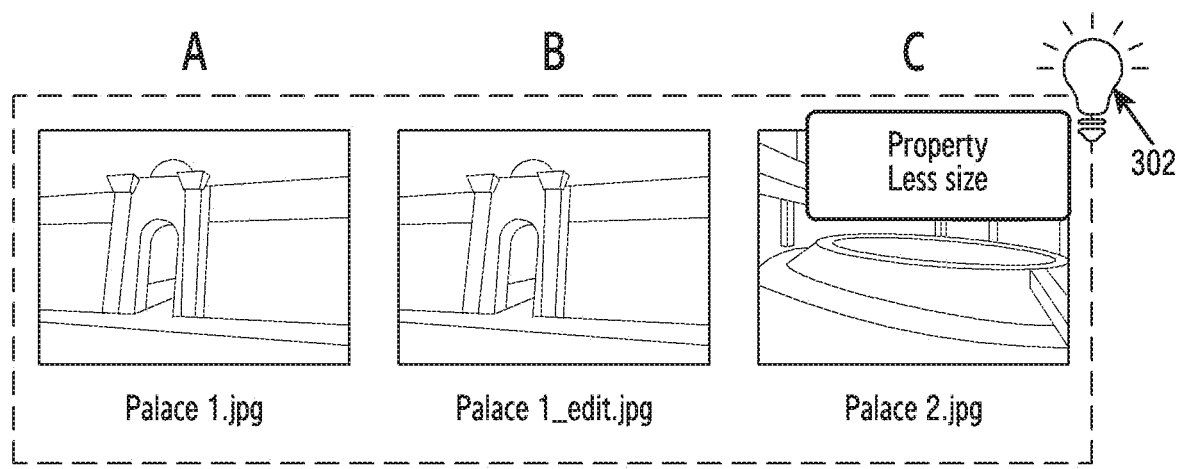

FIGS. 3A and 3B are schematic diagrams illustrating a series of operations performed in a gallery application, according to various embodiments of the disclosure.

Consider that a user is viewing a gallery application which is having of one or more images. Now, consider that the user invokes a bulb being displayed in the gallery application and drags a bulb 302 over three images A, B, and C. At first, the user drags on the first two images and the bulb 302 captures the following information as user actionable item as shown in FIG. 3A.

Image B is the edit version of Image A (colored Red of Image A)

Image A is set as album cover photo

When the user continues to drag the 'Image C', the bulb 302 retrieves that Image C is another image taken around same place of Image A and it is of less in dimension of the other two images. This is possible by extracting the GPS information associated with the three images. The same is shown in FIG. 3B. Further, the bulb also suggests one or more operations to be performed on the images as shown below.

Edit image C (red color) and then set as album cover

Edit image A (to resize of Image C) and then set as album cover

Thus, the bulb 302 is capable of retrieving common or differential information that is the bulb instantly creates the 'travel entity 1' 402 based on the details mentioned in the content of the mail and displays the created 'travel entity 1' 402 to the user present in one or more objects of an application.

Figure 4A:
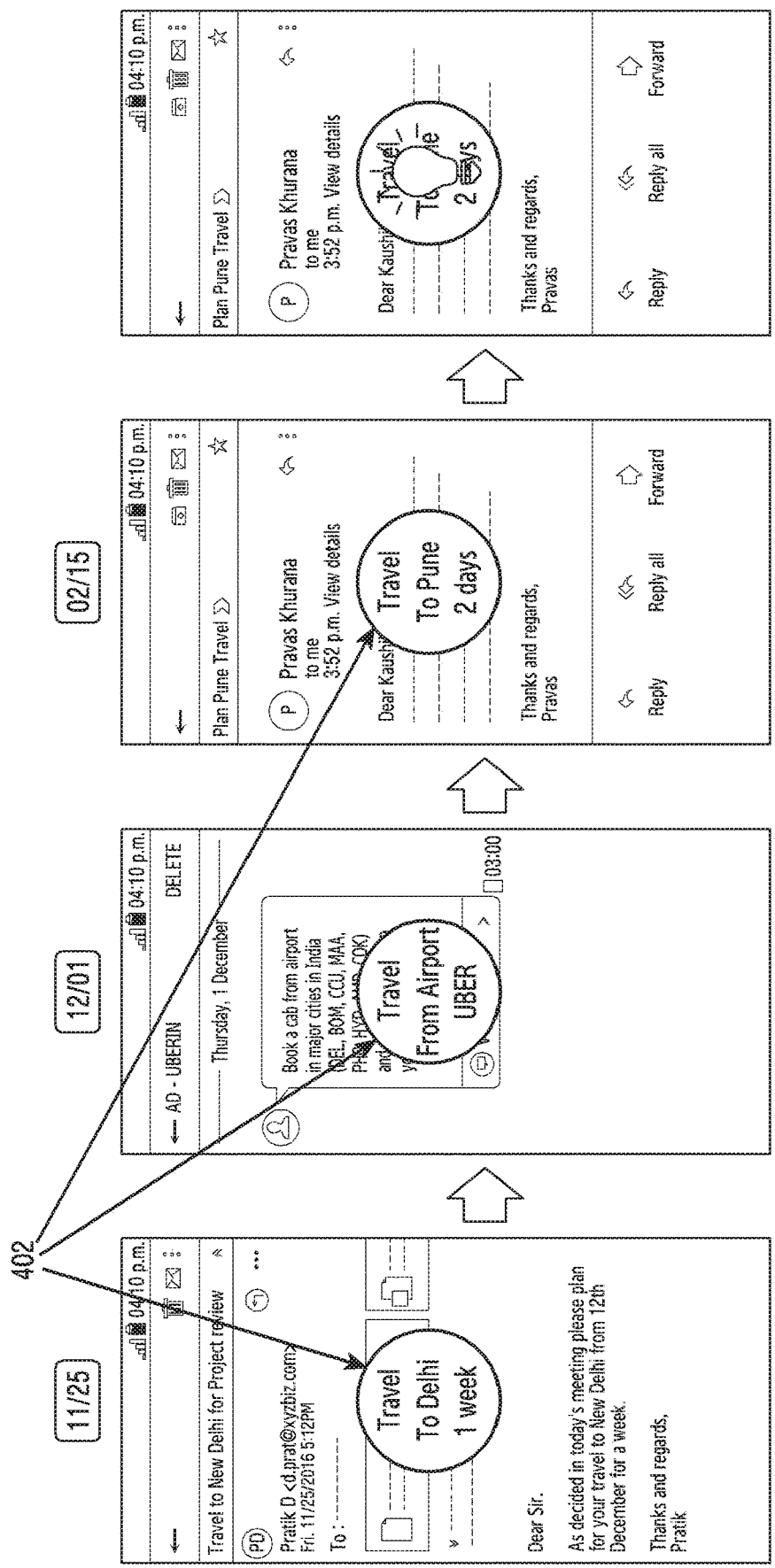
FIGS. 4A and 4B are schematic diagrams illustrating series of operations involved in a use case of creating a travel entity, according to various embodiments of the disclosure.
Figure 4B:
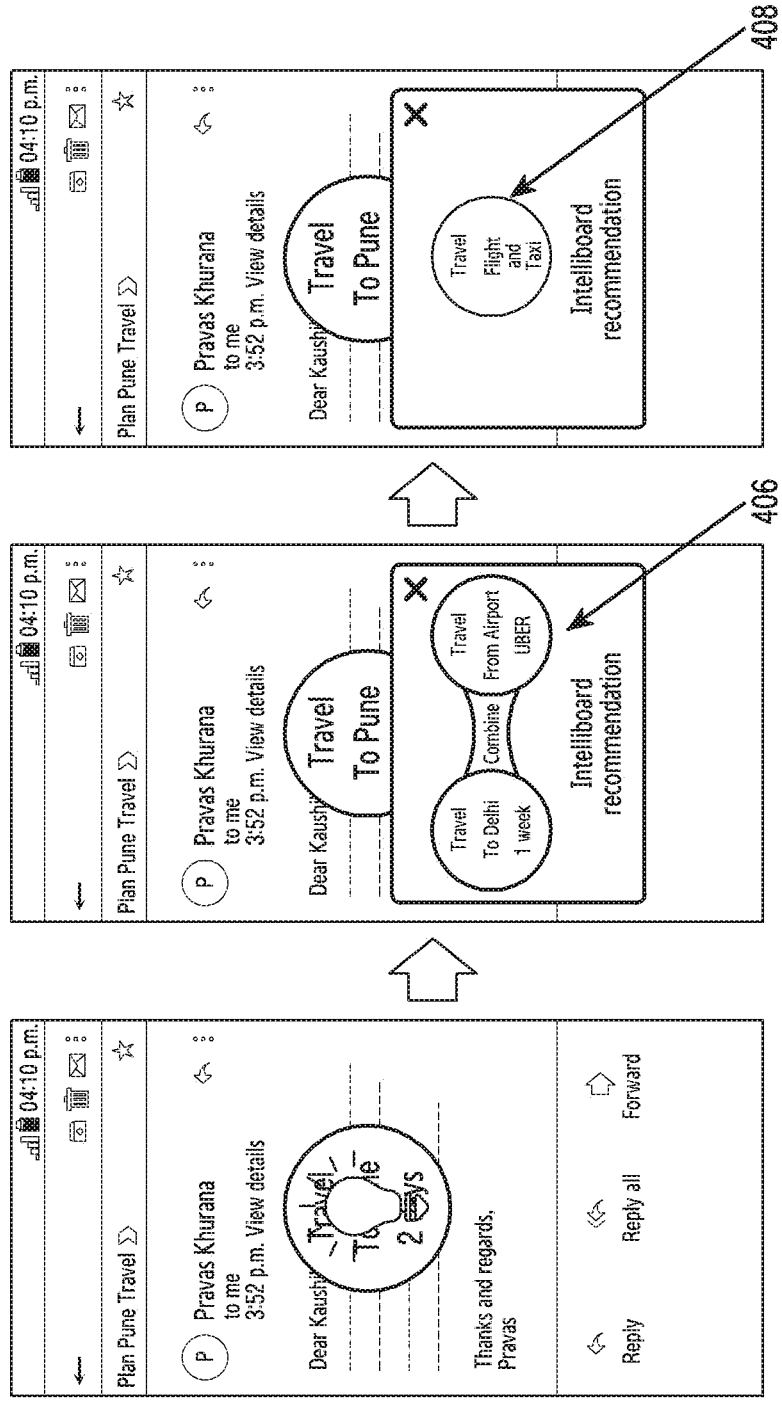

FIGS. 4A and 4B are schematic diagrams illustrating series of steps involved in creating a travel entity, according to various embodiments of the disclosure.

Consider that a user is viewing an email detailing travel plan for the user. The user then invokes a 'bulb' being displayed on the email application and drags over content of the email sent to user B. The bulb instantly creates the 'travel entity 1' 402 based on the details mentioned in the content of the mail and displays the created 'travel entity 1' 402 to the user. Similarly, 'travel entity2' 402 is created based on a received SMS as shown in FIG. 4A. The user may store the created 'travel entity 1' and 'travel entity2' for later use. Now, when the user plans for similar travel, the p disclosure recommends the 'travel entity3' 408 based on the previously created travel entities 406 and suggest the same to the user as shown in FIG. 4B.

Figure 5:
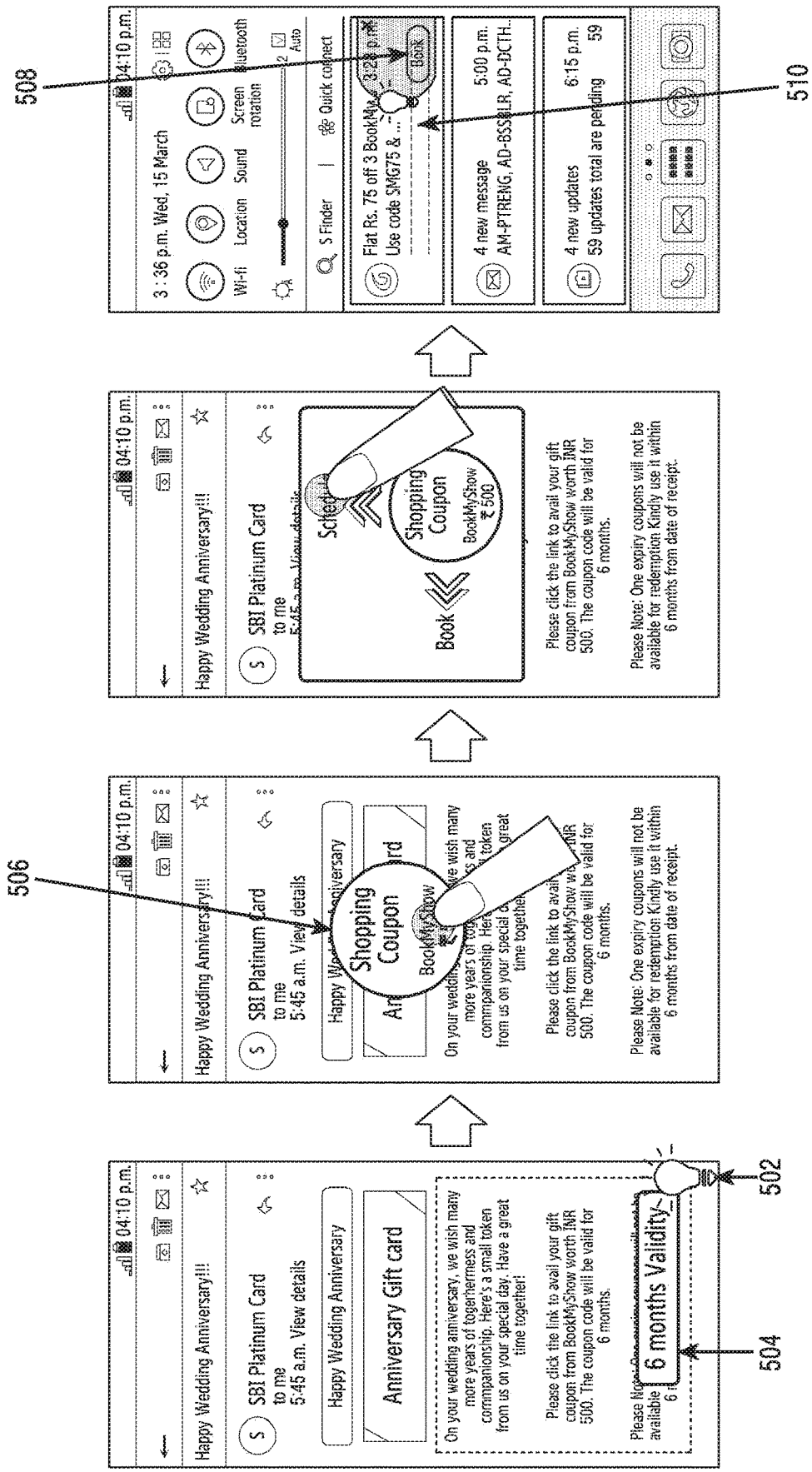
FIG. 5 is a schematic diagram illustrating series of operations performed in a use case of creating a ticket entity, according to an embodiment of the disclosure.

FIG. 5 is a schematic diagram illustrating a series of operations performed in creating a shopping coupon entity, according to an embodiment of the disclosure.

In this embodiment, consider that a user is using a mail application and viewing an email with gift information. The user may activate bulb 502 and drags the bulb 502 across the email content. The bulb 502 captures coupon validity information 504 present in the email content and creates a shopping coupon entity 506 as "Book my show, Rs 500". When the user long presses on the created shopping coupon entity 506, the shopping coupon entity 506 displays options such as 'Schedule' and 'Book'. When the user selects schedule option, the shopping coupon item analyzes validity of the coupon and sends a reminder to the user accordingly. The user may either dismiss the reminder or snooze the reminder to notify about the notification at later point of time. In some embodiments, the reminder may be notified on a notification drawer 508 of a mobile device. In this case, the disclosure relates another notification 510 with the existing Shopping Coupon entity. In addition, the shopping coupon entity 506 also tracks dismissed events, messages etc. for future recommendations.

Figure 6:
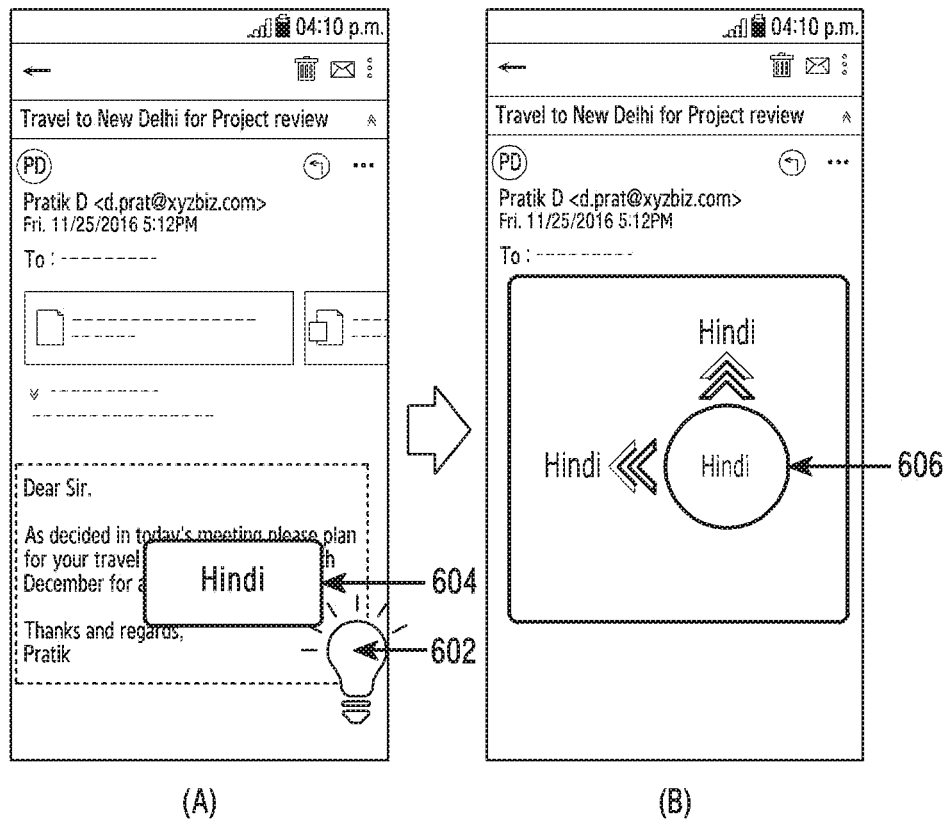
FIG. 6 is a schematic diagram that demonstrates handling of a language related use case, according to an embodiment of the disclosure.

FIG. 6 is a schematic diagram illustrating series of actions performed in use case of creating a language entity, according to an embodiment of the disclosure.

In this embodiment, consider that a user invokes a bulb 602 on an email being displayed on a screen of a user device. Part (A) of FIG. 6 illustrates an embodiment of the disclosure in performing different tasks with same item, where the user's preferred language (Hindi) is different from the user device's default language (English). When the bulb 602 is dragged over the email in English the information captured 604 is shown in Hindi. Different tasks in this embodiment include translation and travel plan based on the intelligent entity 606 created with user's preferred language Hindi. The same is illustrated in part (B) of FIG. 6.

Figure 7A:
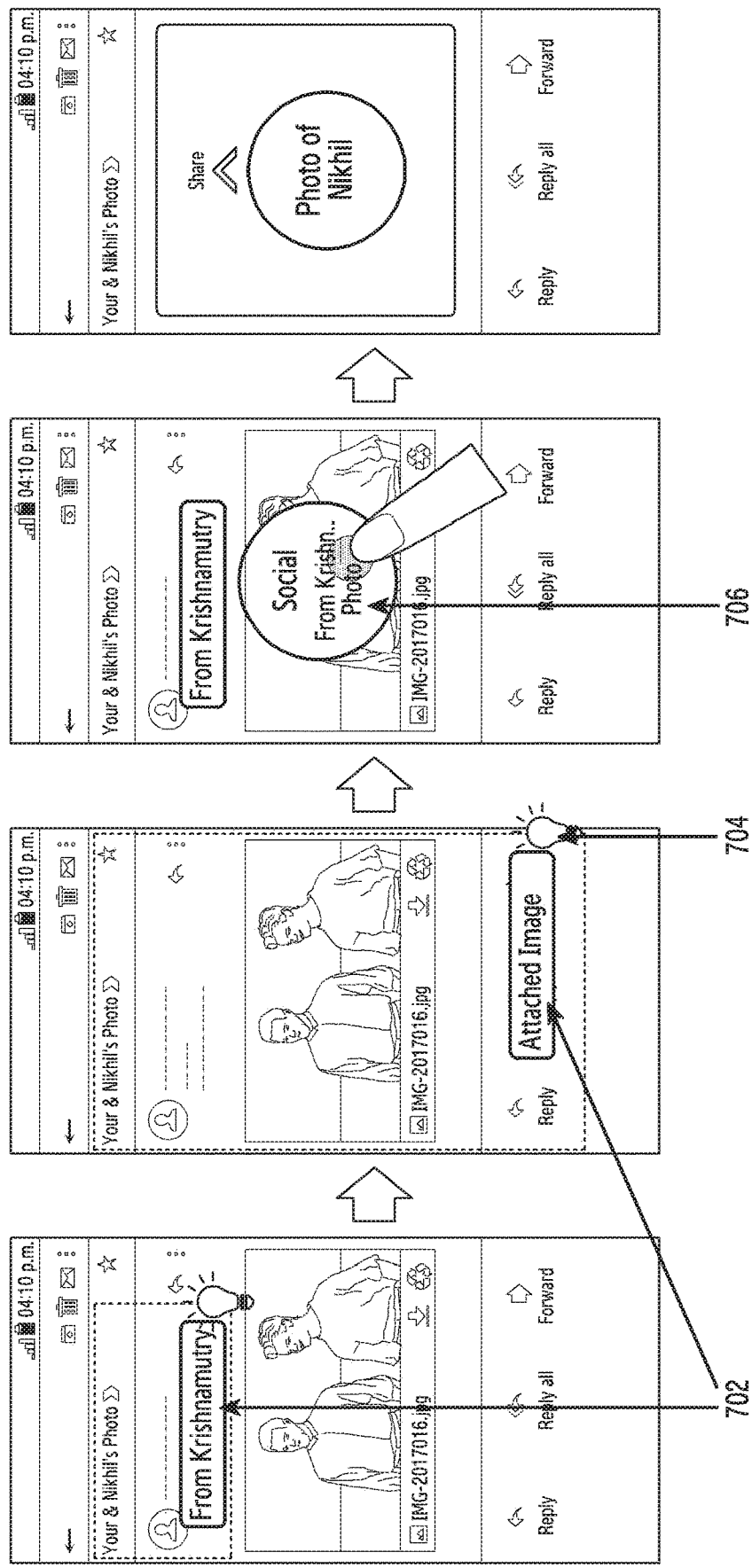
FIGS. 7A, 7B, and 7C are schematic diagrams illustrating a process of creating a social entity, according to various embodiments of the disclosure.
Figure 7B:
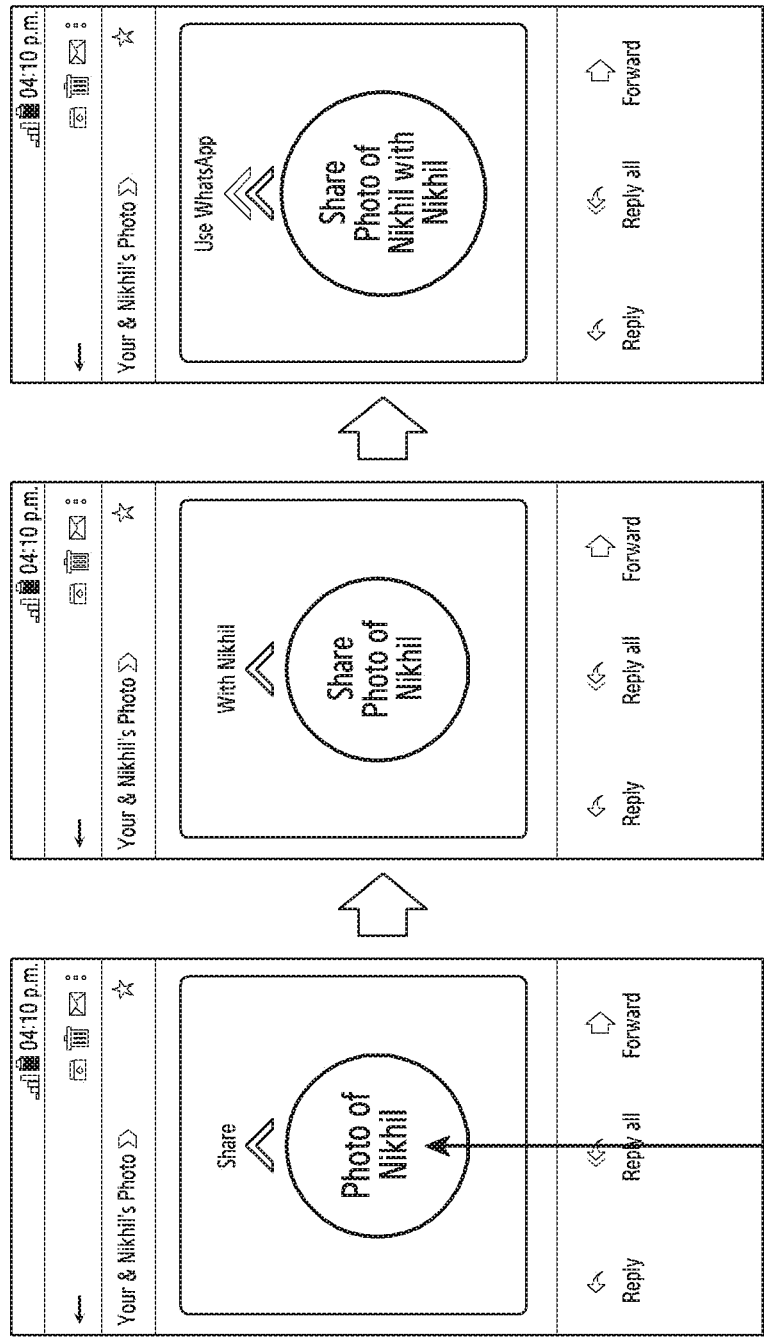
Figure 7C:
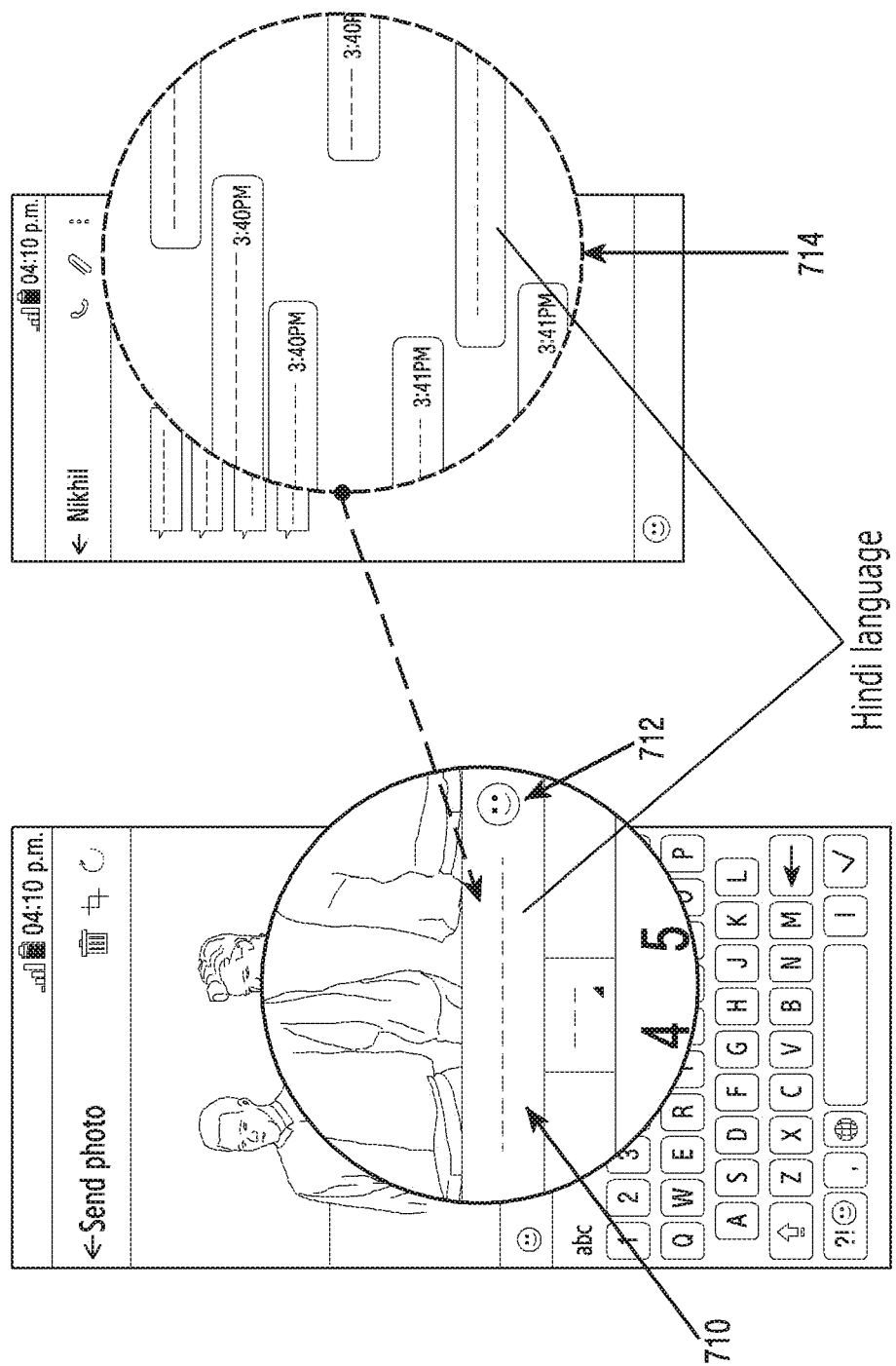

FIGS. 7A, 7B, and 7C are schematic diagrams illustrating a process of creating a social entity, according to various embodiments of the disclosure.

Consider that a first user receives an email along with an image attachment. The first user may activate an indicia such as a 'bulb' 704 and drags the bulb 704 over the email content. The bulb 704 then captures information of one or more user actionable items such as sender of the email 702 and a photo 702. The bulb 704 further identifies a second user tagged in the photo 702. It is to be noted that the bulb 704 may use different types of intelligence to identify the second user. Using the captured information, the bulb 704 creates the social entity 706. When the user long presses on the social entity 706, a share option will be displayed and prompts the first user to share the photo 702 with the second user. The same is shown in FIG. 7A.

In one embodiment, when the first user selects the share option, the social entity 706 automatically displays second user and prompts the first user to share the image with the second user. When the second user is selected, the social entity 706 lists multimedia sharing application such as WhatsApp for sharing the photo 702 with the second user. The multimedia sharing application is listed based on past Application usage history, user preferences and so on. The same is shown in FIG. 7B.

As soon as the user selects the WhatsApp application, the social entity 706 initiates a chat session with the second user for sharing the photo. Further, the social entity 706 creates a message content 710 that reads that the photo is sent by first user in Hindi language. A smiley 712 is also added to the created message based on the context of the message. The message may be created by applying appropriate other intelligences by making it, for example, an informal Hindi message. It is to be noted that though the mail content was in English, the WhatsApp chat message is created in Hindi language based on recent communications 714 with the second user. The same is illustrated in FIG. 7C.

Figure 8:
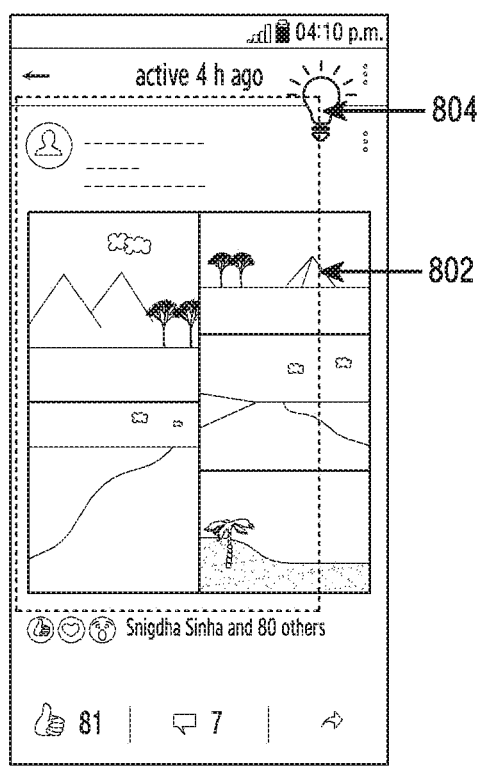
FIG. 8 is a schematic diagram depicting another use case related to creation of a social networking service (SNS) entity, according to an embodiment of the disclosure.

FIG. 8 is a schematic diagram depicting another use case related to creation of a social networking service (SNS) entity, according to an embodiment of the disclosure.

In this embodiment, consider that a user is viewing an album 802 named 'Landscape' posted by his friend on a social media. The user invokes a bulb 804 that is present semi-transparent on a mobile screen and drags the bulb 804 over the album 802 'Landscape'. In response, the bulb 802 retrieves one or more information associated with the album and recommends one or more operations that can be performed by the user. In the above scenario, the bulb 804 retrieves the following information.

Name of the person (ABC)
Place of that person (Seattle)
Phone number of the person from contacts
Place of Travel (Aruba) from photos (Aruba beach) or text
Distance from current location (Bangalore)
Travel means (Needs flight booking)
Duration
From current location
In actual venue Using the above retrieved information, the bulb 804 creates a new SNS entity and displays the following operations to the user.

Plan Travel
Call person (ABC) for details

On selecting 'plan travel', the SNS entity displays the following options to the user for planning the trip.

Book flight ticket (use promotion information gathered earlier)
Book hotel (use promotion information gathered earlier)
Calendar update When the user selects, 'Call person (ABC)', the SNS entity searches phone number of the person from contacts and displays phone no. of the person to make a call. It is to be noted that the call may either a voice or a video call and it is configured based on user preferences and activity history of the user.

Figure 9:
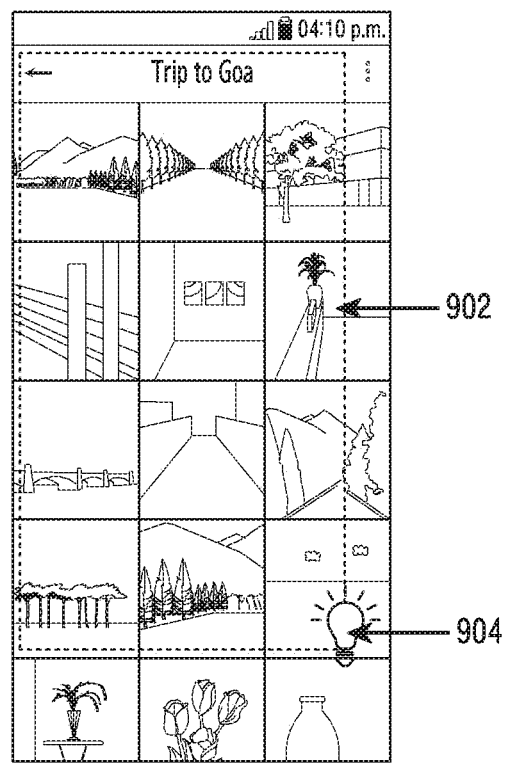
FIG. 9 is a diagram illustrating an example related to a gallery application, according to an embodiment of the disclosure.

FIG. 9 is a diagram illustrating an example related to a gallery application, according to an embodiment of the disclosure.

In this embodiment, consider that a user is viewing his own gallery application named "trip to Goa" on a mobile device. The user invokes a bulb 904 that is present semi-transparent on a mobile screen and drags the bulb 904 over the album 'Trip to Goa' 902. In response, the bulb 904 retrieves one or more information associated with the album and recommends one or more operations that can be performed by the user. In the above scenario, the bulb 904 retrieves the following information.

Place of visit
Mode of transport
Mode of booking
Hotel of stay
Mode of booking (fetched using related information)

Based on the above retrieved information, the bulb 904 creates a new gallery entity and displays the following operations to the user.

Create travel plan for sharing
Write Blog

For each of the above listed operation, the gallery entity launches appropriate application accordingly.

Figure 10:
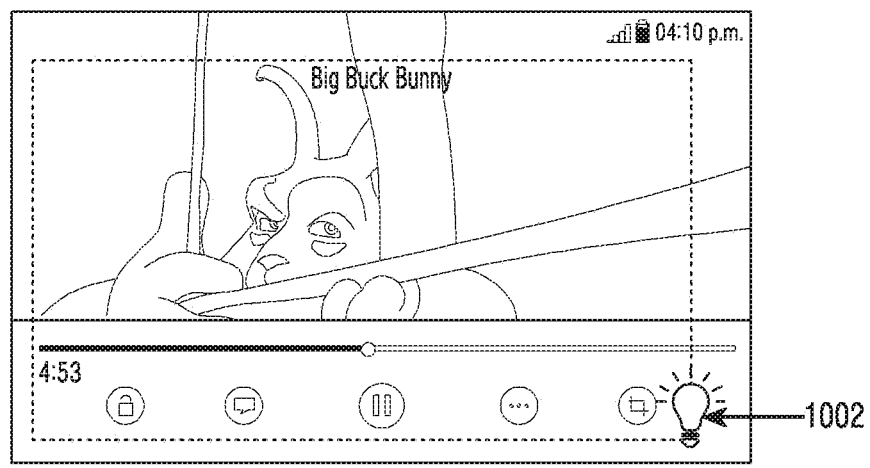
FIG. 10 is a schematic diagram that exemplifies the multimedia related application, according to an embodiment of the disclosure.

FIG. 10 is a schematic diagram that exemplifies the multimedia related application, according to an embodiment of the disclosure.

In this embodiment, consider that a user is watching a video on a mobile device. While watching the video, the user invokes a bulb 1002 that is present semi-transparent on a mobile screen and drags the bulb 1002 over the video. In turn, the omni-present bulb 1002 extracts information such as name of the player used, type of audio track chosen, and mode of the video (portrait/landscape) being watched. The bulb 1002 based on the above extracted information, creates a multimedia entity and suggests one or more tasks that can be performed by the user. For example, the multimedia entity recommends the user to set the player as default video playback.

Figure 11:
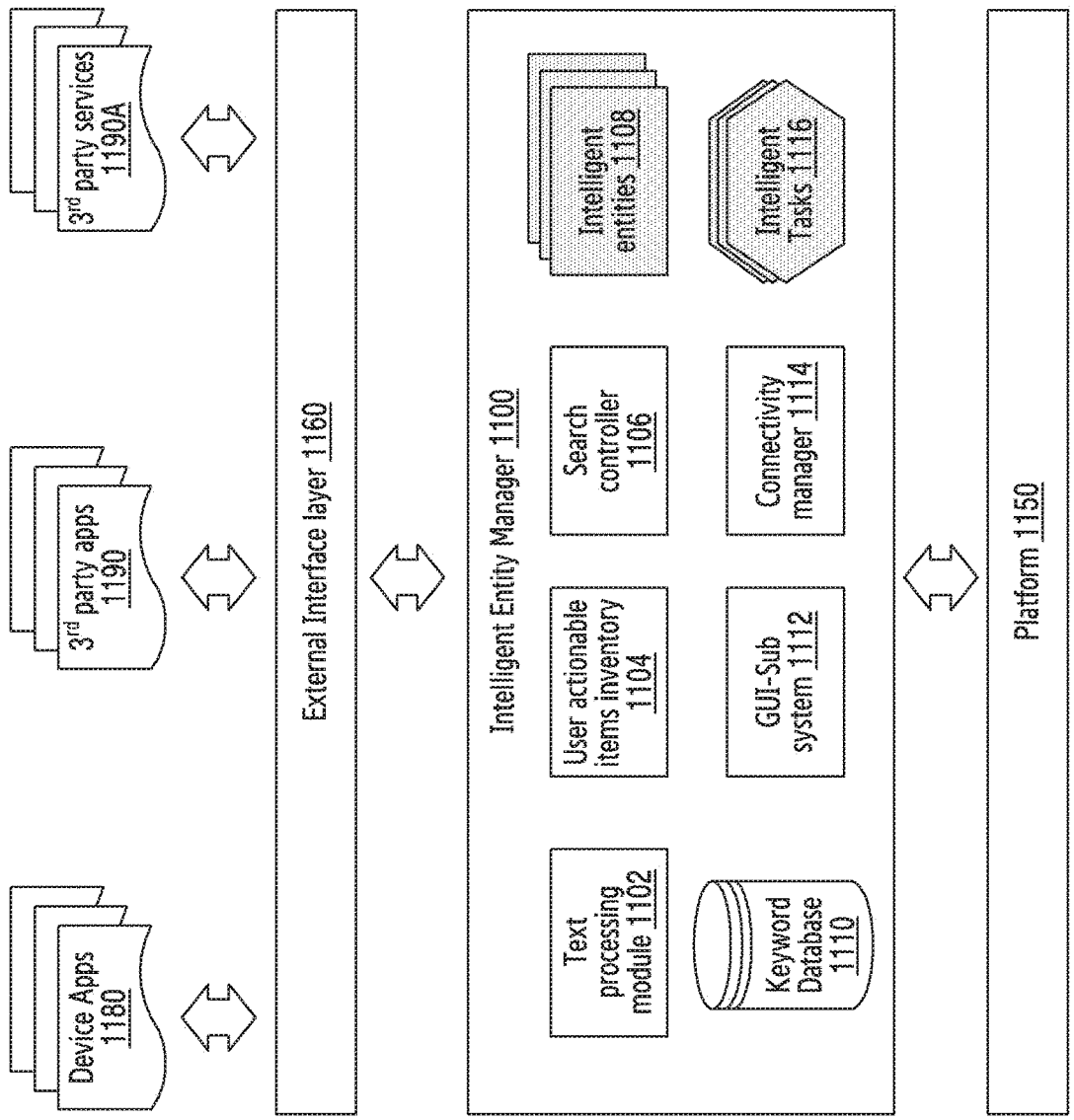
FIG. 11 is a block diagram illustrating an architecture of a user device, according to an embodiment of the disclosure.

FIG. 11 is a block diagram illustrating an architecture of a user device, according to an embodiment of the disclosure.

As shown in FIG. 11, the user device comprises of a software platform 1150, an Intelligent entity manager 1100, an external interface layer 1160, a plurality of device applications 1180, a plurality of third party applications 1190 and its associated services 1190A. The intelligent entity manager 1100 further comprises of a text processing module 1102, a user actionable items inventory 1104, a search controller 1106, plurality of intelligent entities 1108, a keyword database (DB) 1110, a graphical user interface (GUI)-sub system 1112, a connectivity manager 1114, and plurality of intelligent tasks 1116.

The text processing module 1102 is adapted for processing the text displayed on the user's screen by the application. The user actionable items inventory 1104 maintains a record of all the active items associated with one or more applications of the user device. The search controller 1106 is adapted for controlling searches performed relating to actionable items/entities stored in the user device. The keyword DB 1110 comprises of keywords that are used while identifying intelligent information. The GUI-sub system 1112 is responsible for showing various user interface elements. The connectivity manager 1114 manages the connections with different devices while executing the intelligent tasks. The intelligent tasks 1116 is adapted for managing one or more tasks to be performed by executing an appropriate device application. The intelligent entities 1108 is adapted for capturing one or more intelligent information associated with one or more user actionable items encompassed within a user selected region. The same is illustrated in FIG. 11.

Figure 12A:
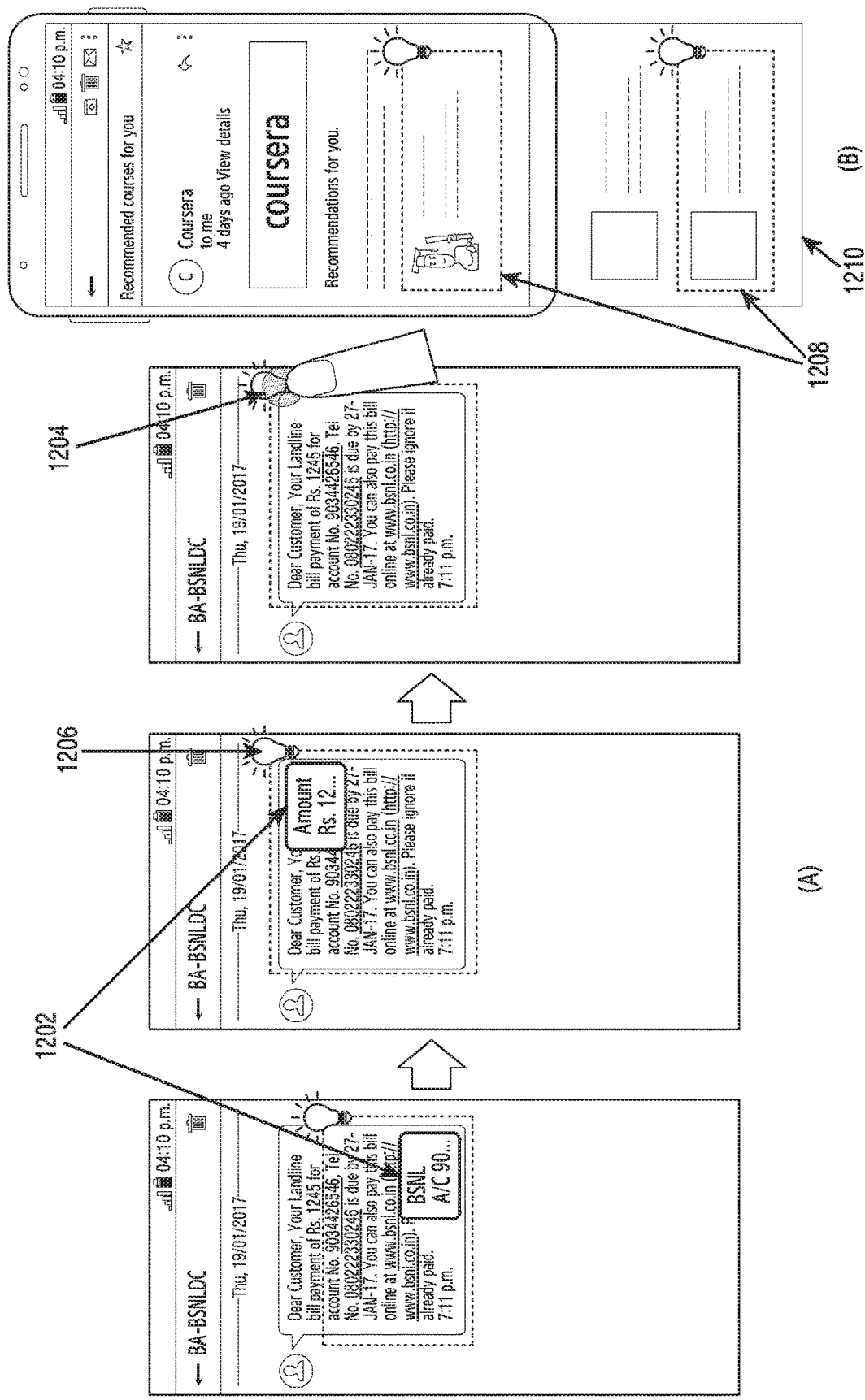
FIGS. 12A and 12B are schematic diagrams illustrating a method of capturing information of plurality of device contents from one or more user selected regions on a mobile device screen, according to an embodiment of the disclosure.
Figure 12B:
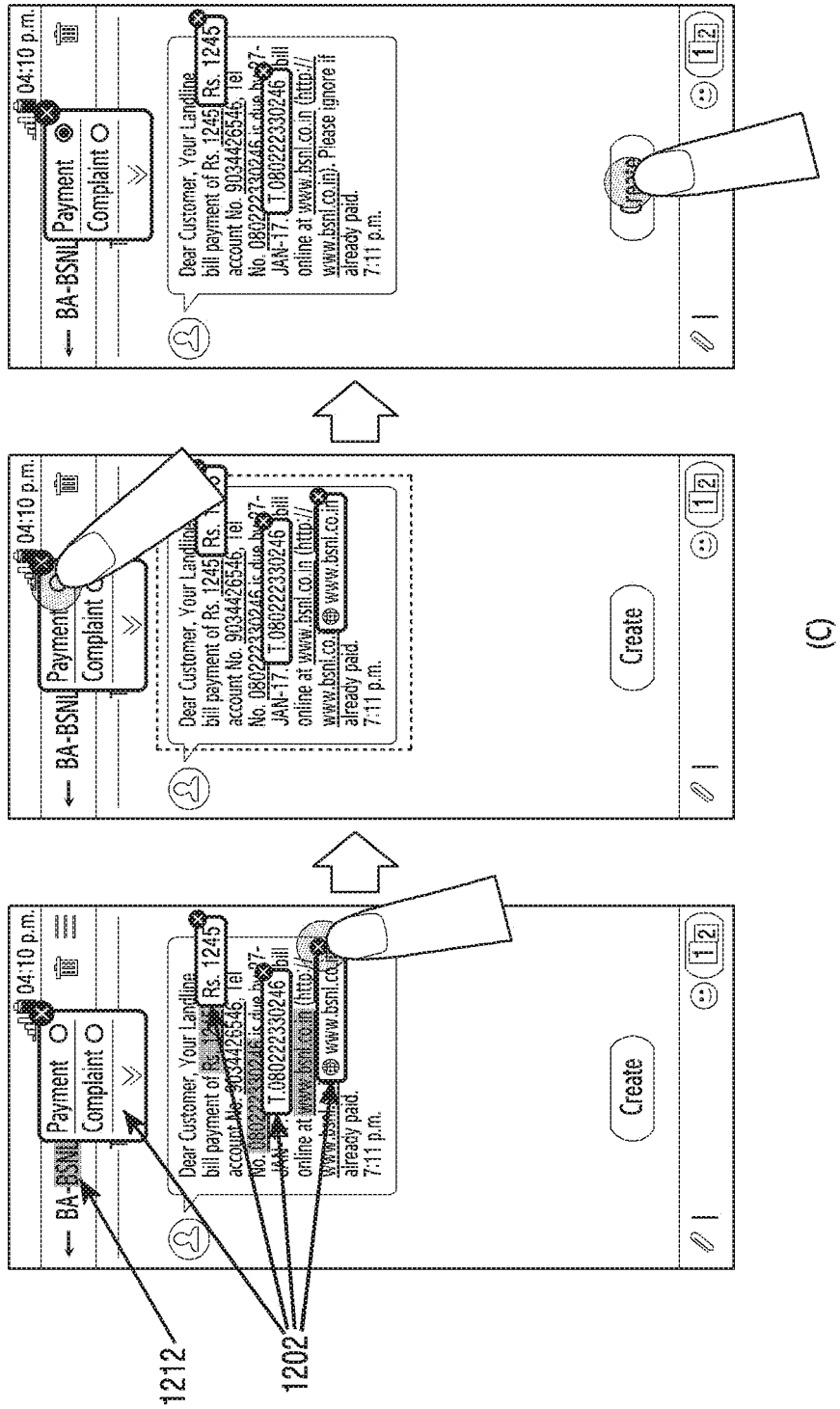

FIGS. 12A and 12B are schematic diagrams illustrating a method of capturing information of plurality of device contents from one or more user selected regions on a mobile device screen, according to an embodiment of the disclosure.

In order to initiate information capturing process, a user invokes a bulb 1206 that is present semi-transparent on a mobile device screen such as one shown in FIG. 2. At first, the user provides a touch gesture/tap on the bulb 1206, due to which, the bulb 1206 becomes fully visible on the screen. The user then long presses on the bulb 1206 and drags the bulb 1206 over plurality of device contents present in the mobile screen. The information capturing process terminates when the user stops providing the drag gesture 1204. As the user drags the bulb 1206 on one or more regions, the bulb 1206 captures one or more actionable items and visually indicates the captured one or more actionable items on the mobile screen as shown in part (A) of FIG. 12A. The bulb 1206 also captures information present in multiple part of a content in a long email, photo etc. The same is shown in part (B) of FIG. 12A where information is captured from multiple parts 1208 of a long email including information from a part 1210 of the email that is beyond current display window. In some other embodiments, the bulb may automatically select multiple regions in the long email and the user may select/deselect one or more regions out of them. The bulb may then capture information from only the user selected regions.

In another embodiment, once the user invokes the bulb, the bulb automatically identifies information from the content displayed on the mobile screen. As shown in part (C) of FIG. 12B, the set of automatically detected actionable items 1202 are displayed next of the display elements 1212 used to capture the information. The user can then edit each item according to his choice.

Figure 13:
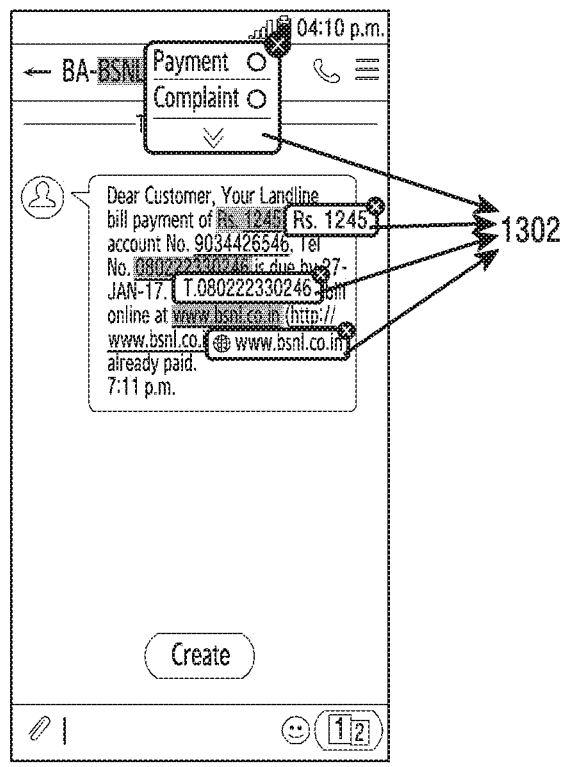
FIG. 13 is a schematic diagram illustrating a method of detecting one or more user actionable items as shown in FIG. 2, according to an embodiment of the disclosure.

FIG. 13 is a schematic diagram illustrating a method of detecting one or more user actionable items as shown in FIG. 2, according to an embodiment of the disclosure.

In this embodiment, the bulb is configured with a predefined list of known categories defined using regular expressions or keywords. The one or more keywords or expressions comprises at least one of phone number, address, trade name, account number, image etc. As shown in FIG. 13, the bulb searches for at least one of the above mentioned keywords and retrieves the keyword 'amount' from device content being displayed on a mobile screen. Based on the retrieved information, the bulb creates user actionable entity 'payment' 1302 as shown in FIG. 13.

Figure 14A:
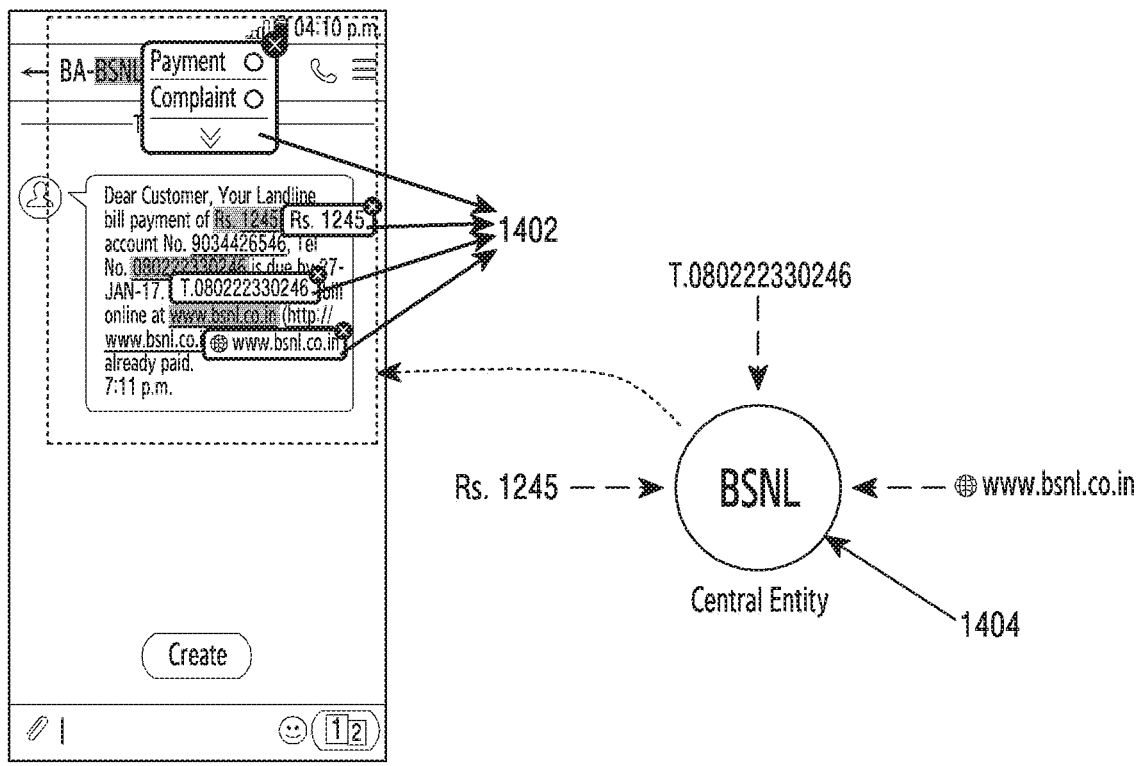
FIGS. 14A and 14B are schematic diagrams illustrating a method of recognizing inter-relationship between one or more user actionable items, according to various embodiments of the disclosure.
Figure 14B:
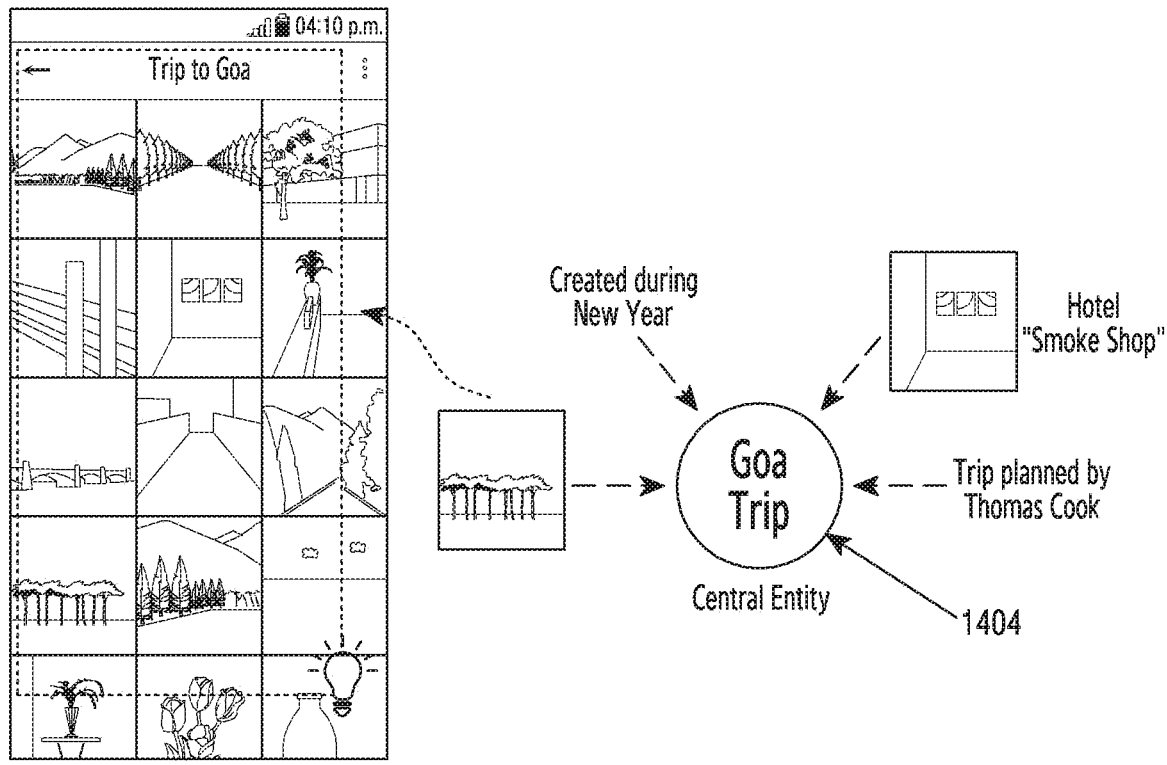

FIGS. 14A and 14B are schematic diagrams illustrating a method of recognizing inter-relationship between one or more user actionable items, according to various embodiments of the disclosure.

Referring to FIG. 14A, consider that a bulb automatically captures one or more user actionable items 1402 from a currently displayed message on a mobile screen. For the above example, the bulb captures the following information
Sender: BSNL
Tel No.: T.08022330246
Amount: Rs 1245
URL: www.bsnl.co.in
The bulb then recognizes that detected items telephone number, amount, URL etc. are related to BSNL and detects BSNL as a central entity 1404. The same is illustrated in FIG. 14A.

Similarly, the bulb analyzes inter-relationship among the one or more photos present in a gallery application as shown in FIG. 14B. In one embodiment, when the bulb is dragged over the one or more photos present in the gallery application, the bulb automatically identifies common factor among them. The bulb further analyzes information on person who uploaded, place where the photos were taken, date, time, occasion etc., to find the common factor. As shown in FIG. 14B, the bulb identifies that the detected items—person who uploaded photos, name of the place, date mentioned in the album etc., are related to Goa trip, the bulb creates 'Goa trip' is the central entity 1404. The same is illustrated in FIG. 14B.

Figure 15A:
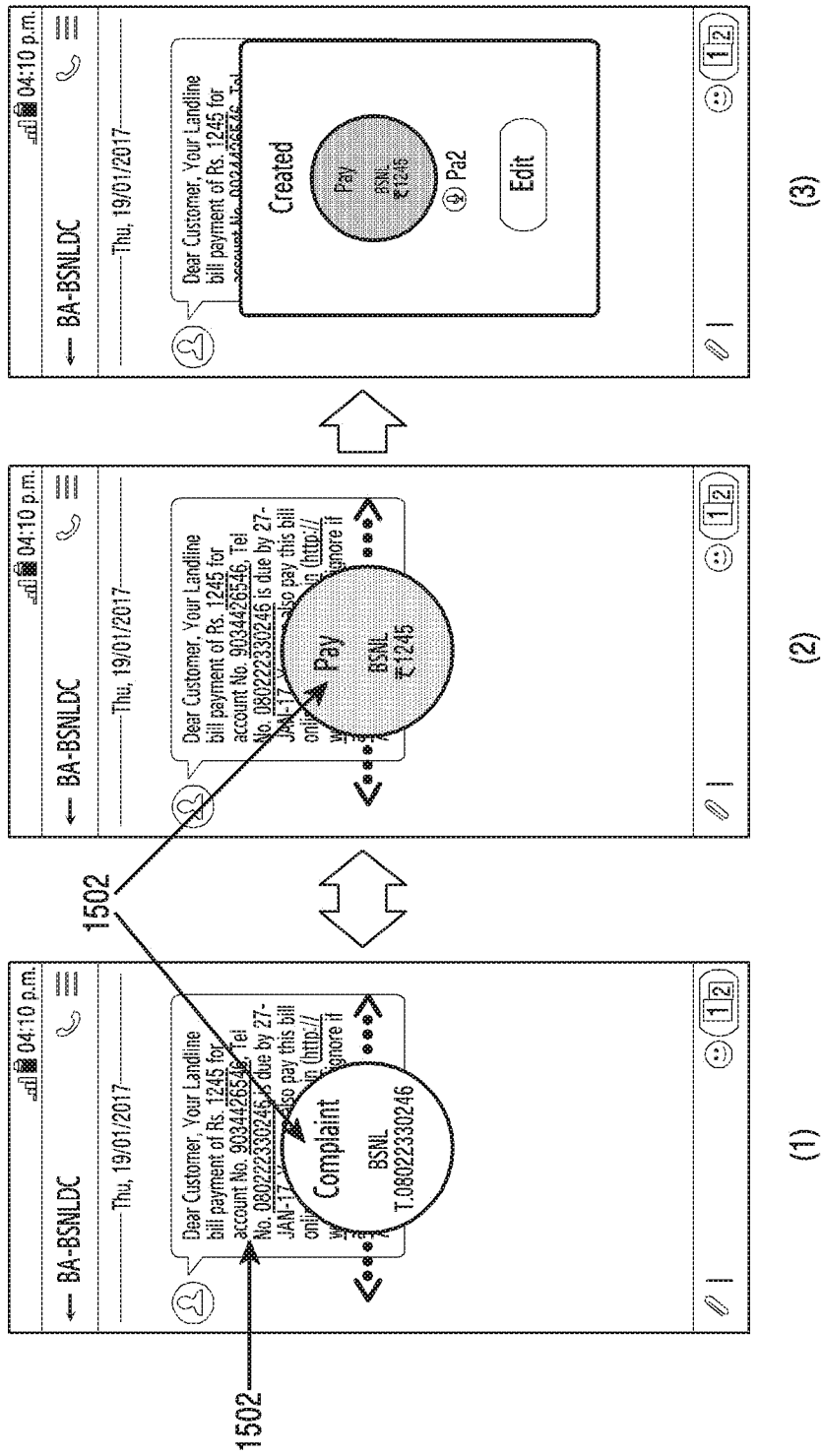
FIGS. 15A and 15B are schematic diagrams illustrating a method of creating one or more user actionable entities based on detected user actionable items, according to various embodiments of the disclosure.
Figure 15B:
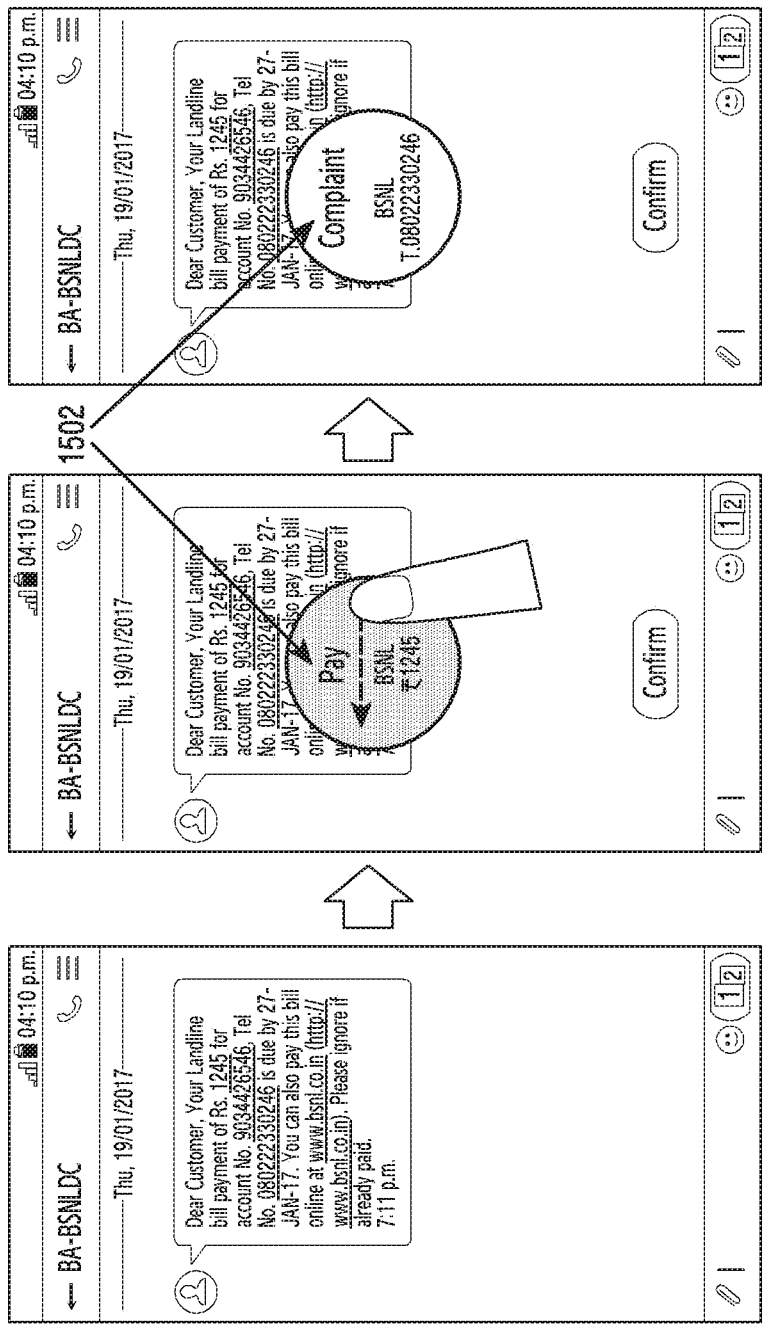

FIGS. 15A and 15B are schematic diagrams illustrating a method of creating one or more user actionable entities based on detected user actionable items, according to various embodiments of the disclosure.

Consider that a user has received a mobile bill message as shown in FIG. 2. As described in the earlier sections, one or more user actionable items such as BSNL, Rs 1245, www.bsnl.co.in etc. are retrieved. Using the retrieved user actionable items, one or more user actionable entities 1502 are created. The created user actionable entities 1502 are displayed to the user along with its attributes. The bulb can also create more than one user actionable entities based on the retrieved information and allows a user to navigate across the created user actionable entities to choose right one. The one or more actionable entities created for a message of FIG. 2 is shown in parts (1), and (2) of FIG. 15A.

Once the actionable entity 1502 is created, the user is allowed to edit or manually change the information captured. The user is provided with an edit option to edit the created actionable entity 1502. The same is shown in part (3) of FIG. 15A. In some embodiments, the user can also choose to change the actionable entity 1502 being created from the same captured information. For the example shown in FIG. 15A, the user is prompted to confirm the task 'payment' being created. The user may then change the 'payment' task to 'complaint' task. The same is illustrated in FIG. 15B.

Figure 16:
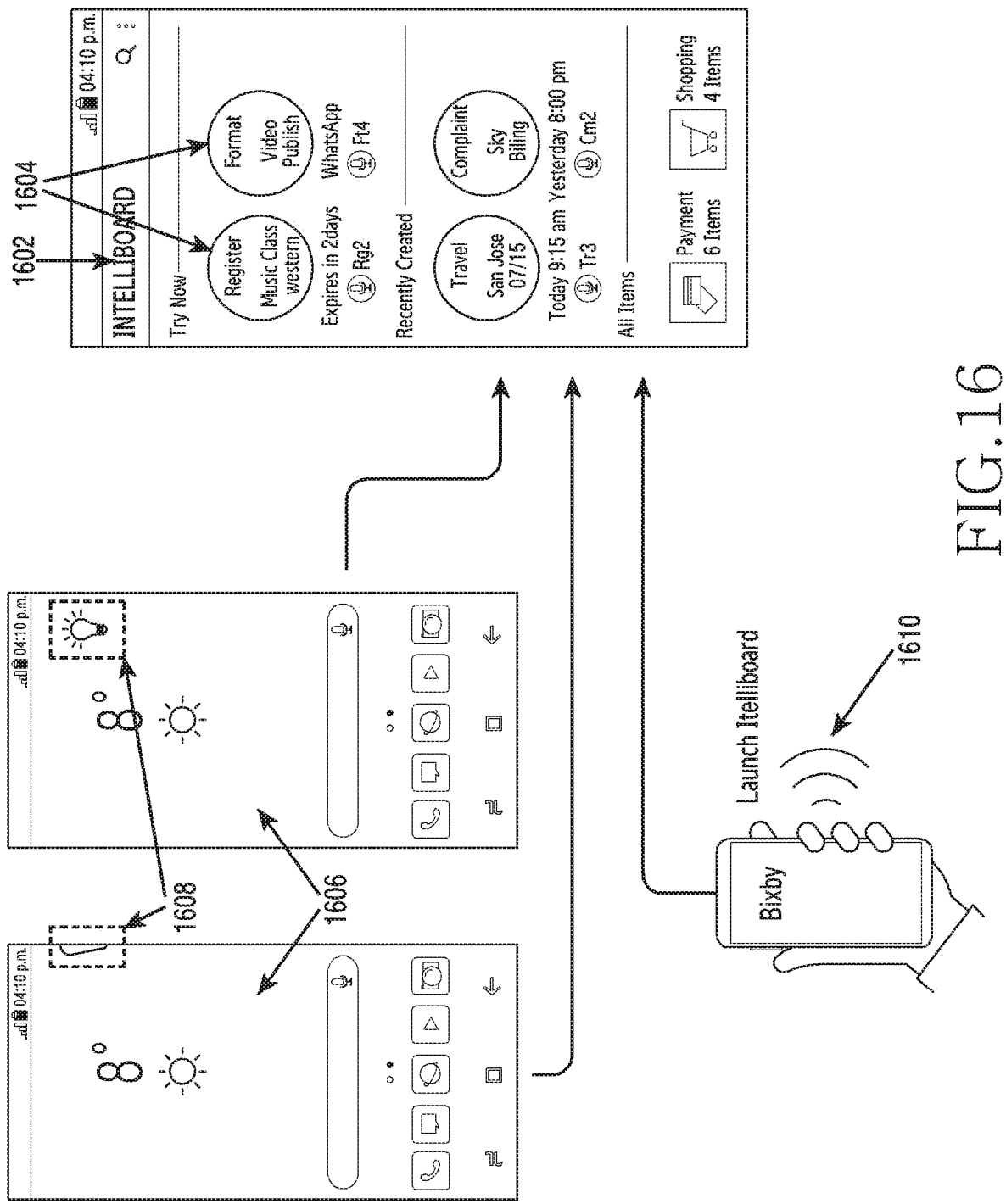
FIG. 16 is a schematic diagram illustrating different ways of launching a user interface element from a home screen of a user device, according to an embodiment of the disclosure.

FIG. 16 is a schematic diagram illustrating different ways of launching a user interface element from a home screen of a user device, according to an embodiment of the disclosure.

According to this embodiment, the user interface element is hereinafter referred as Intelliboard as per FIG. 16. The Intelliboard 1602 is a place where all the created user actionable tasks are stored and displayed for future use. A user may launch the Intelliboard 1602 from the home screen 1606 of the user device by providing a touch/tap gesture on a specific indication 1608 provided on top corner of the user device. In one embodiment, user may launch the Intelliboard 1602 by double tapping on a bulb or any other image provided on the home screen 1606 of the user device. In another embodiment, the Intelliboard 1602 can be launched using Bixby, a virtual assistant enabled devices. The Bixby launches the Intelliboard 1602 based on specific voice command provided by the user such as, "Launch Intelliboard" 1610. After launching the Intelliboard, the various user actionable tasks 1604 stored inside the Intelliboard 1602 are shown on the home screen of the Intelliboard 1602. The same is illustrated in FIG. 16.

FIGS. 17A, 17B, 17C, and 17D are schematic diagrams illustrating different ways of operating on an intelligent entity stored in an Intelliboard using Bixby voice command, according to various embodiments of the disclosure.

Figure 17A:
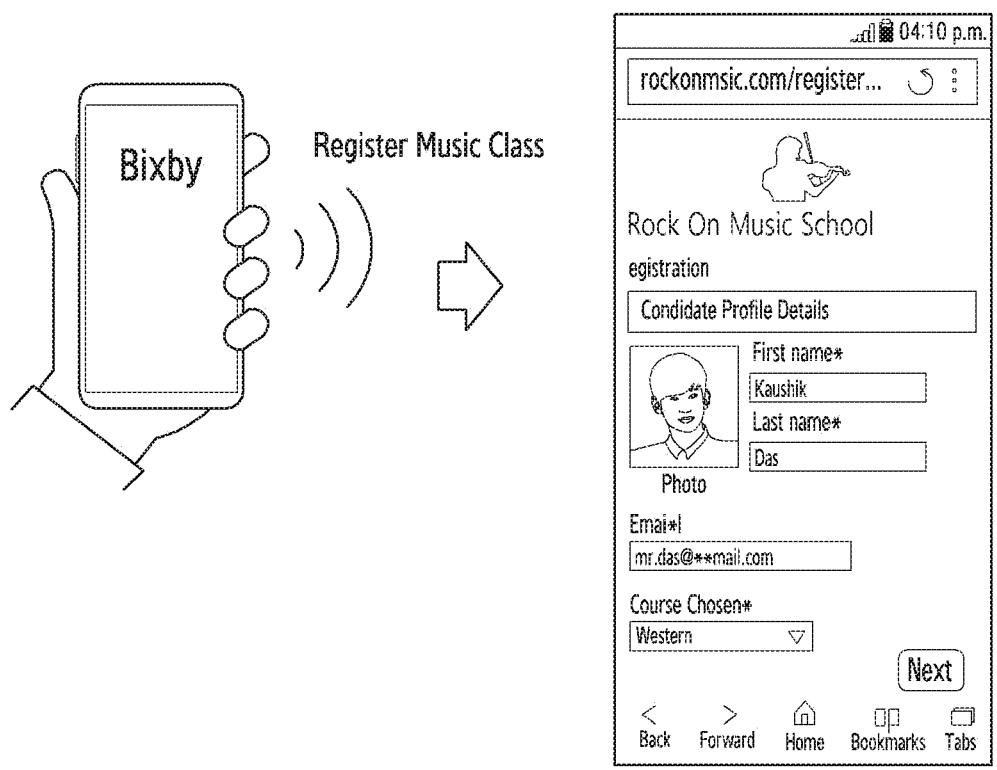
FIGS. 17A, 17B, 17C, and 17D are schematic diagrams illustrating different ways of operating on an intelligent entity stored in an Intelliboard using Bixby voice command, according to various embodiments of the disclosure.
Figure 17B:
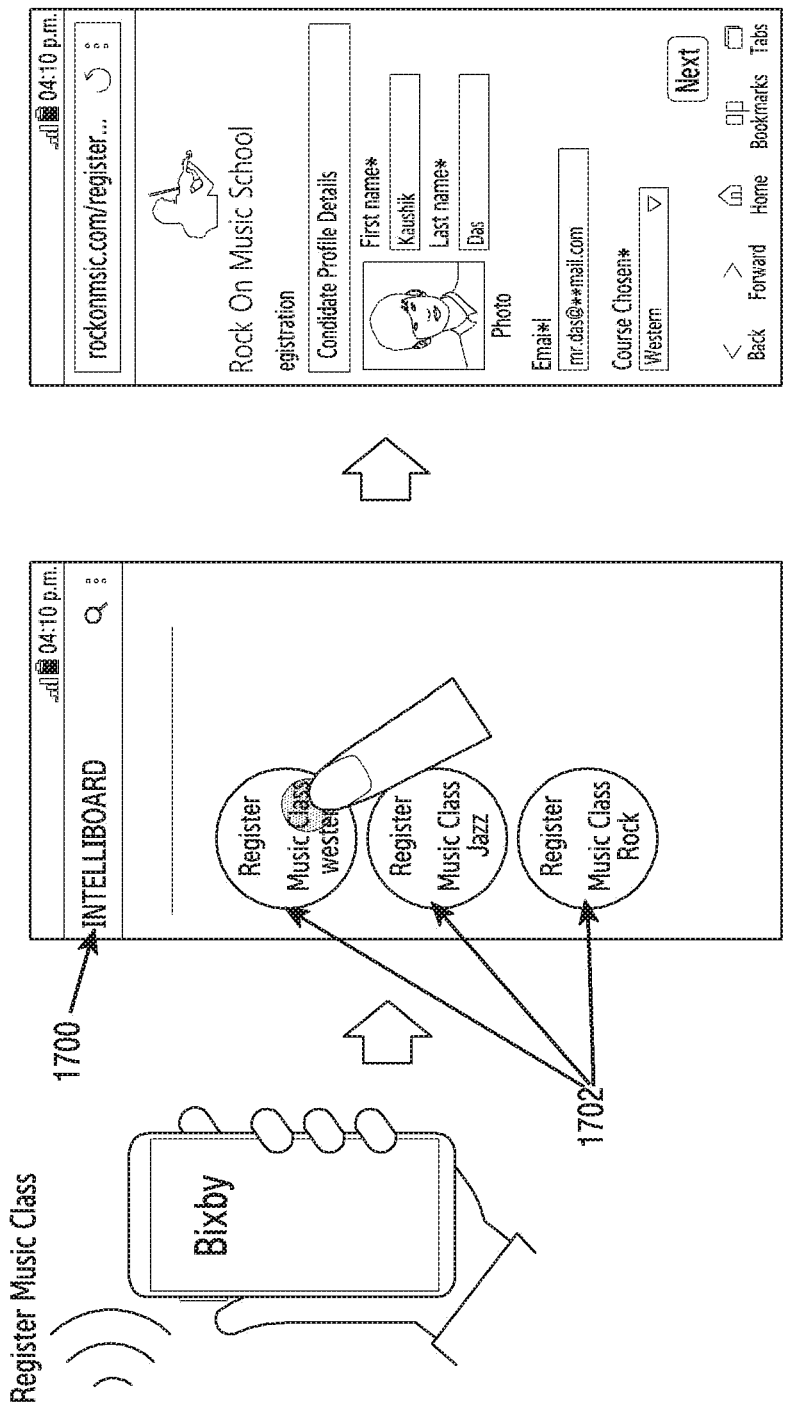

In this embodiment, consider that a user device is enabled with Bixby-virtual assistant system. The user uses Bixby voice commands to launch a saved task using one or more keywords. For example, the Bixby may provide voice command as "Register Music class". In response to the voice commands, all the tasks that are saved in the Intelliboard 1700 are searched and the task with the keywords "register music class" is retrieved accordingly. The same is shown in FIG. 17A. In some embodiments, if the user keywords match multiple tasks, then all matching tasks 1702 are listed to the user. The user can then choose one from the list. Otherwise, the user may use additional keywords to launch the specific task. The same is illustrated in FIG. 17B.

Figure 17C:
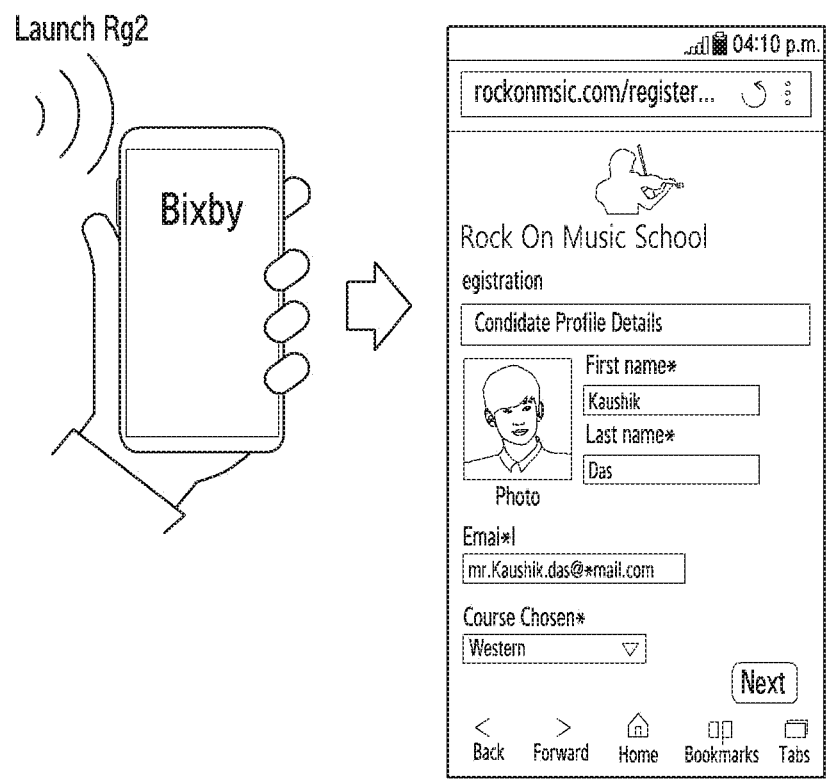

In some other embodiments, a task id is used to launch a task. In the Intelliboard 1700, each task is automatically assigned a unique identifier that will be addressable by Bixby to accomplish the task captured by the Intelliboard 1700. Using the task id, a task can be invoked by Bixby-virtual assistant system at any point in time. For example, a user uses Bixby voice command to launch the intended task by using the task id-Rg2. Accordingly, task id having rg2 is retrieved and displayed to the user. The same is illustrated in FIG. 17C.

Figure 17D:
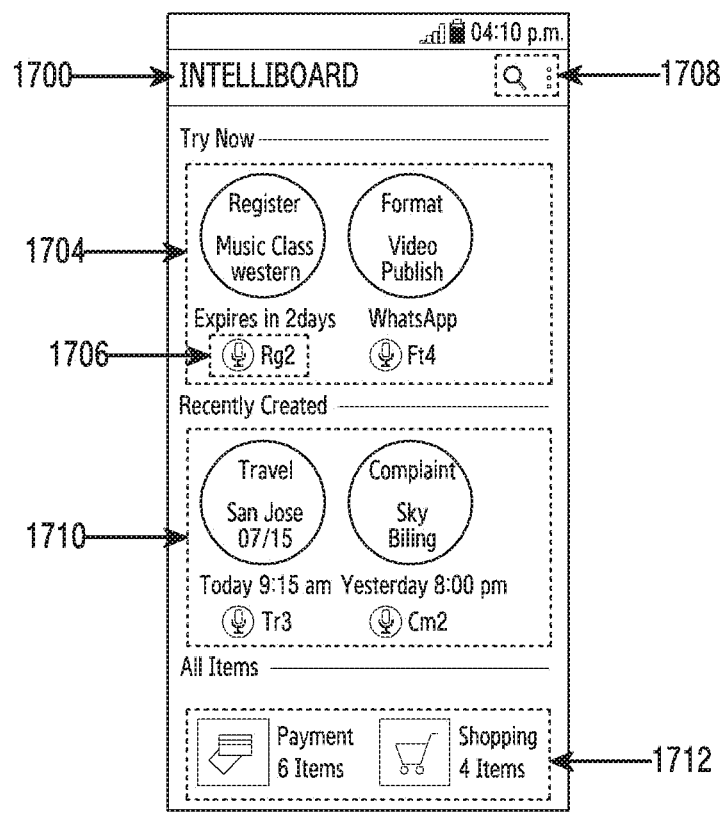

In one embodiment, the most user actionable tasks 1704 that is launched from the Intelliboard 1700 may appear automatically on a specific app screen. In another embodiment, an app that might have executed an Intelliboard 1700 earlier may display related task(s) based on the context. For example, one or more tasks 1704 are displayed based on date, current pending tasks, currently opened apps, currently viewed images/videos/chat messages and so on. The Intelliboard 1700 also comprises of tasks 1710 that are recently executed. Further, tasks 1712 that are created can be grouped into different categories and displayed on the Intelliboard 1700. The user can navigate across all categories and also perform various operations involving one or more task(s) from same or different categories. In an embodiment, a task may be executed by specific Bixby command 1706 ("Execute Rg2"). Each task is automatically assigned a unique identifier that will be addressable by Bixby to accomplish the task captured by the task. Using these commands, the task may be invoked by Bixby system at any point in time. Further, user may perform various operations on tasks like search, view details, edit using a search tap 1708. The same is illustrated in FIG. 17D.

Figure 18:
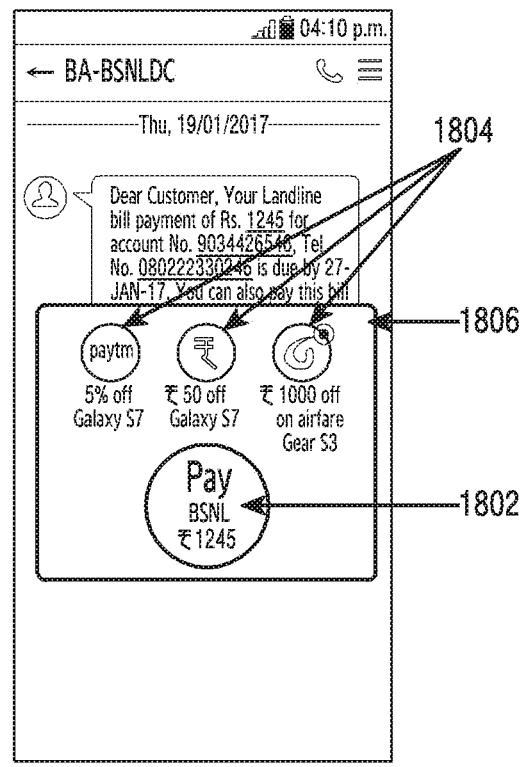
FIG. 18 is a schematic diagram illustrating a method of recommending one or more applications to execute a task being created, according to an embodiment of the disclosure.

FIG. 18 is a schematic diagram illustrating a method of recommending one or more applications to execute a task being created, according to an embodiment of the disclosure.

According to this embodiment, for the created task 1802, an intelligent entity manager suggests one or more applications 1804 to perform the task. In case, multiple applications 1804 are displayed, the intelligent entity manager provides an indication 1806 to select an appropriate application to invoke. In one embodiment, the intelligent entity manager stores a static mapping of task against applications. A mapping of tasks against applications are shown in Table 1, below.

TABLE 1

| Task | Application |
| --- | --- |
| Pay | PayTM, My Galaxy |
| Travel | Uber, KakaoTaxi |
| Video | VLC Player, KMPlayer |

In another embodiment, the intelligent entity manager learns rules from past user actions to suggest preferred tasks/applications.

Figure 19:
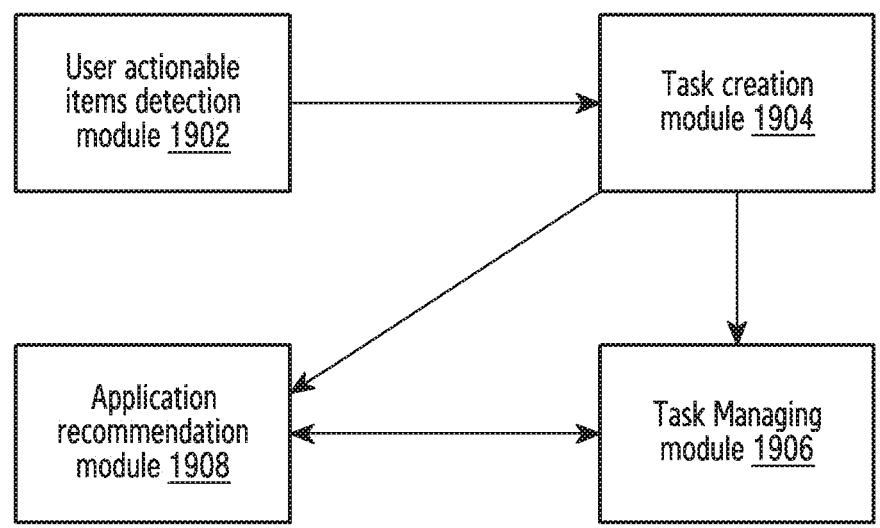
FIG. 19 is a block diagram illustrating one or more modules of a user interface element involved in an application recommendation method, according to an embodiment of the disclosure.

FIG. 19 is a block diagram illustrating one or more modules of a user interface element involved in an application recommendation method, according to an embodiment of the disclosure.

The one or more modules comprises of user actionable items detection module 1902, task creation module 1904, task managing module 1906, and an application recommendation module 1908.

The user actionable items detection module 1902 is adapted for capturing one or more user actionable items in a user selected region. In one embodiment, user actionable items detection module 1902 checks whether a bulb is invoked by a user on one or more user selected area. If the bulb is invoked, user actionable items detection module 1902 detects one or more actionable items present in the user selected area and sends the detected one or more actionable items to the task creation module. In another embodiment, system automatically detects and displays one or more user actionable items for application data to the user. The user then selects one or more user actionable items and sends it to the task creation module 1904. In some embodiments, the detected one or more user actionable items are forwarded to the task creation module to create one or more tasks.

The task creation module 1904 is adapted for creating one or more tasks based on information associated with one or more user actionable items. At first, the task creation module determines a central entity for the one or more user actionable items. Then, the task creation module 1904 applies one or more rules on the central entity and the associated one or more user actionable items to detect category and associated parameters. A rule created for executing a payment entity is shown below.

if ActionableItems.isCentralObject(SMS)
    and ActionableItems.isPresent(Amount)
    and ActionableItems.isPresent(UserName)
    and ActionableItems.isPresent(PayeeName)
    then
    IntelliTask.Category="Payment"

The created one or more tasks are shared with task managing module 1906. The task managing module 1906 is adapted for managing one or more user actionable entities being created in an Intelliboard. In one embodiment, the Intelliboard is launched using voice command received from Bixby or a touch gesture from a user. In response to the voice command, the Intelliboard displays the saved user actionable entities sorted by category, frequently used etc. From the displayed one or more user actionable entities, a particular user actionable entity is selected. In some embodiments, the user actionable entity is selected by providing a touch gesture. Then, one or more tasks associated with the user actionable entity is executed accordingly. Further, the user device recommends one or more applications to execute the one or more tasks. In addition, the user device highlights the appropriate application with an indication to select the application.

Figure 20:
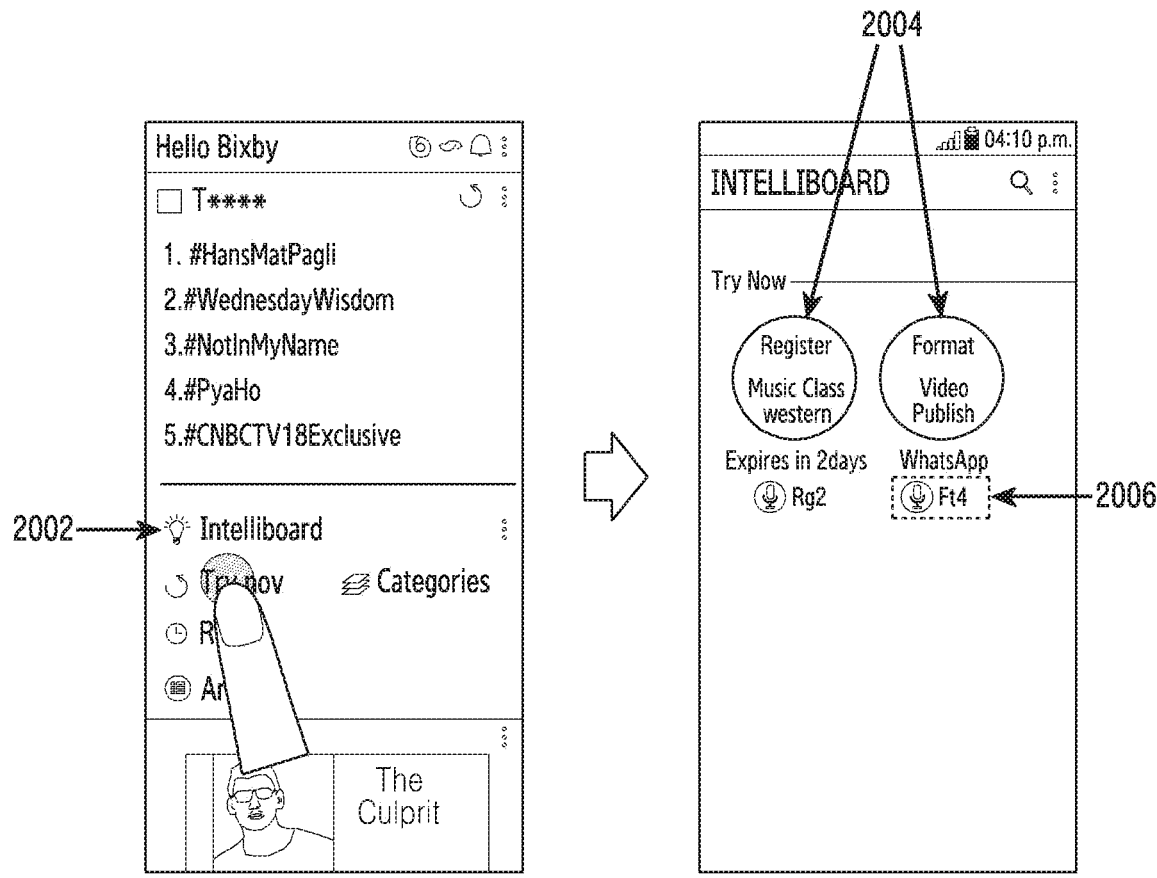
FIG. 20 is a schematic diagram illustrating a method of launching Intelliboard from Bixby sub menu, according to an embodiment of the disclosure.

FIG. 20 is a schematic diagram illustrating a method of launching Intelliboard from Bixby sub menu, according to an embodiment of the disclosure.

According to this embodiment, a user can launch an Intelliboard 2002 in Bixby enabled devices. The virtual assistant-Bixby comprises of Intelliboard sub menus. Therefore, the Intelliboard 2002 may become one of the sub menus of Bixby because of its frequent usage. The Intelliboard is provided with one or more categories to select a particular actionable entity for executing a particular task. As shown in FIG. 20, on selecting any of the categories such as 'try now', 'recently created' etc., the relevant saved tasks 2004 will be displayed inside Intelliboard 2002. It is to be noted that the displayed tasks can be launched by providing voice command 2006 using Bixby.

Figure 21:
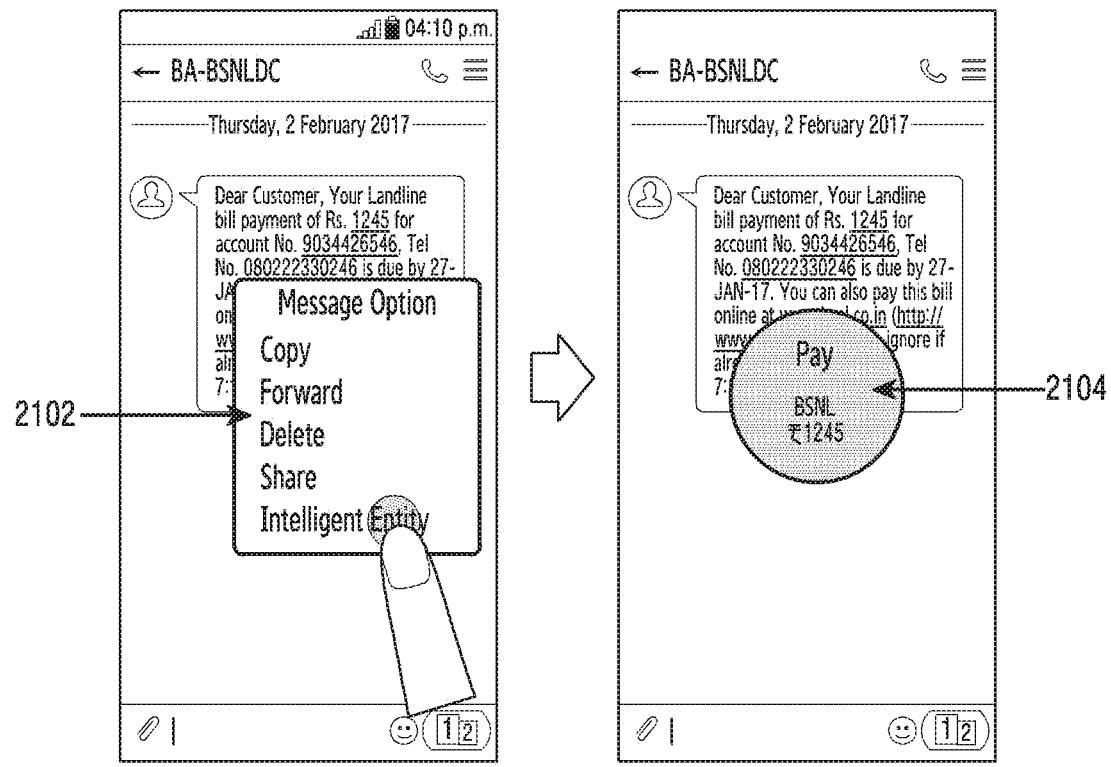
FIG. 21 is a diagram illustrating a method of executing a task using Bixby sub menu, according to an embodiment of the disclosure.

FIG. 21 is a schematic diagram illustrating a method of executing a task using Bixby sub menu, according to an embodiment of the disclosure.

In this embodiment, the user can launch a task to be executed from an application Sub Menu. For example, the user may provide long press of an item of text. In response, a menu 2102 with one or more options for the selected text such as copy, forward, delete, share, add as actionable entity etc., are displayed to the user. When the user selects add as actionable entity 2104, an actionable entity 2104 is created based on the context of text selected by the user. The same is illustrated in FIG. 21.

Figure 22:
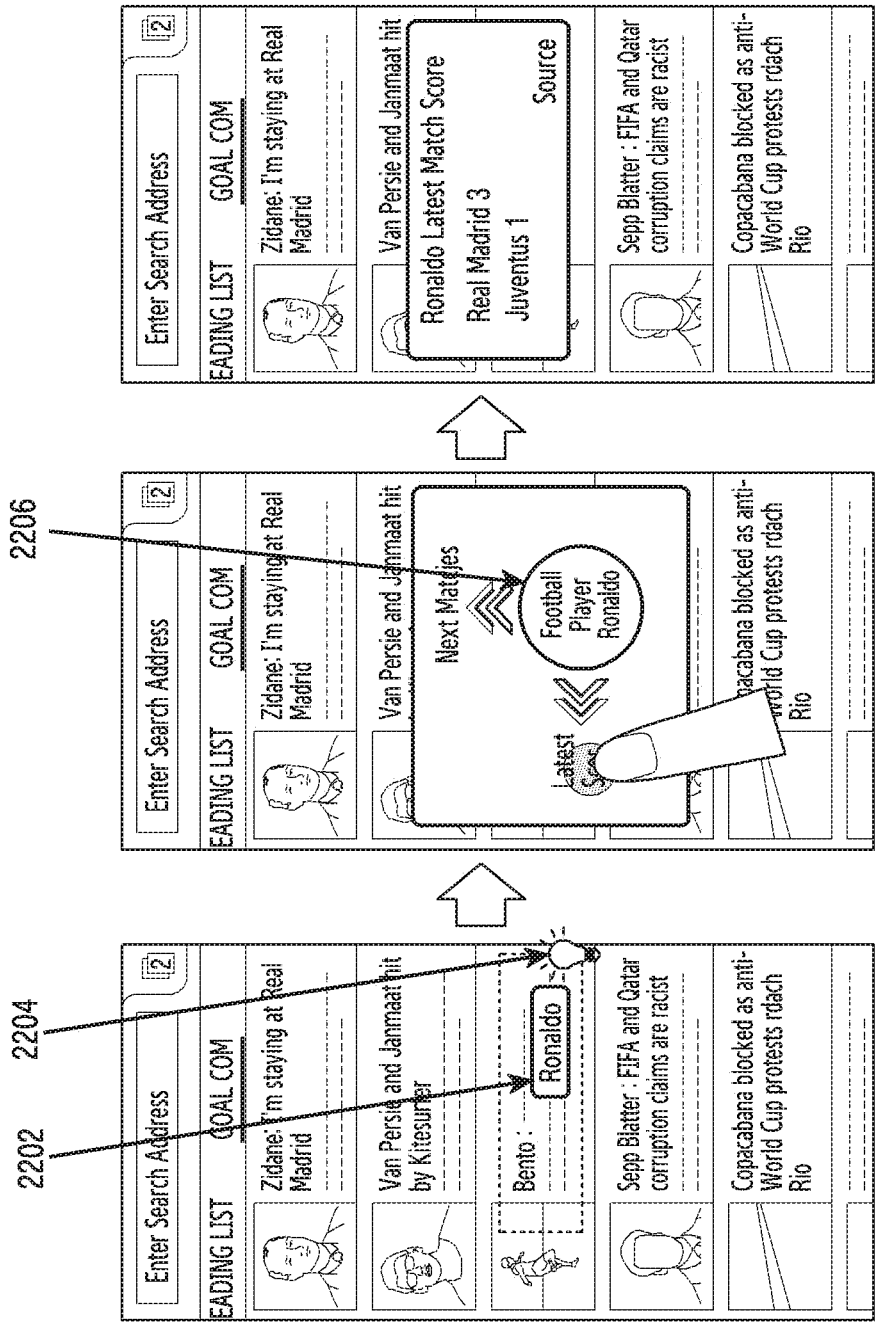
FIG. 22 is a schematic diagram illustrating a series of operations performed in creating a sports entity using Bixby sub menu, according to an embodiment of the disclosure.

FIG. 22 is a schematic diagram illustrating a series of operations performed in creating a sports entity using Bixby sub menu, according to an embodiment of the disclosure.

Consider that a user is viewing sports news on a Bixby sub menu. The user may invoke a bulb 2204 and drags the bulb 2204 on a news article. The bulb 2204 detects keywords in a user selected region and visually indicates a user actionable item 2202 in the user selected region to the user. When the user selects the user actionable item 2202, the bulb 2204 displays user actionable entity 2206 along with one or more options. As shown in FIG. 22, the bulb 2204 detects keyword 'Ronaldo' and further identifies that he is a football player. Accordingly, the bulb 2204 fetches information about Ronaldo and displays one or more options relating to Ronaldo 2206. As can be seen, the bulb 2204 displays 'latest scores' and 'next matches' associated with Ronaldo 2206. If the user selects option 'latest scores', the bulb intelligently fetches information about the scores and displays the latest scores on a mobile screen. The same is illustrated in FIG. 22.

Figure 23:
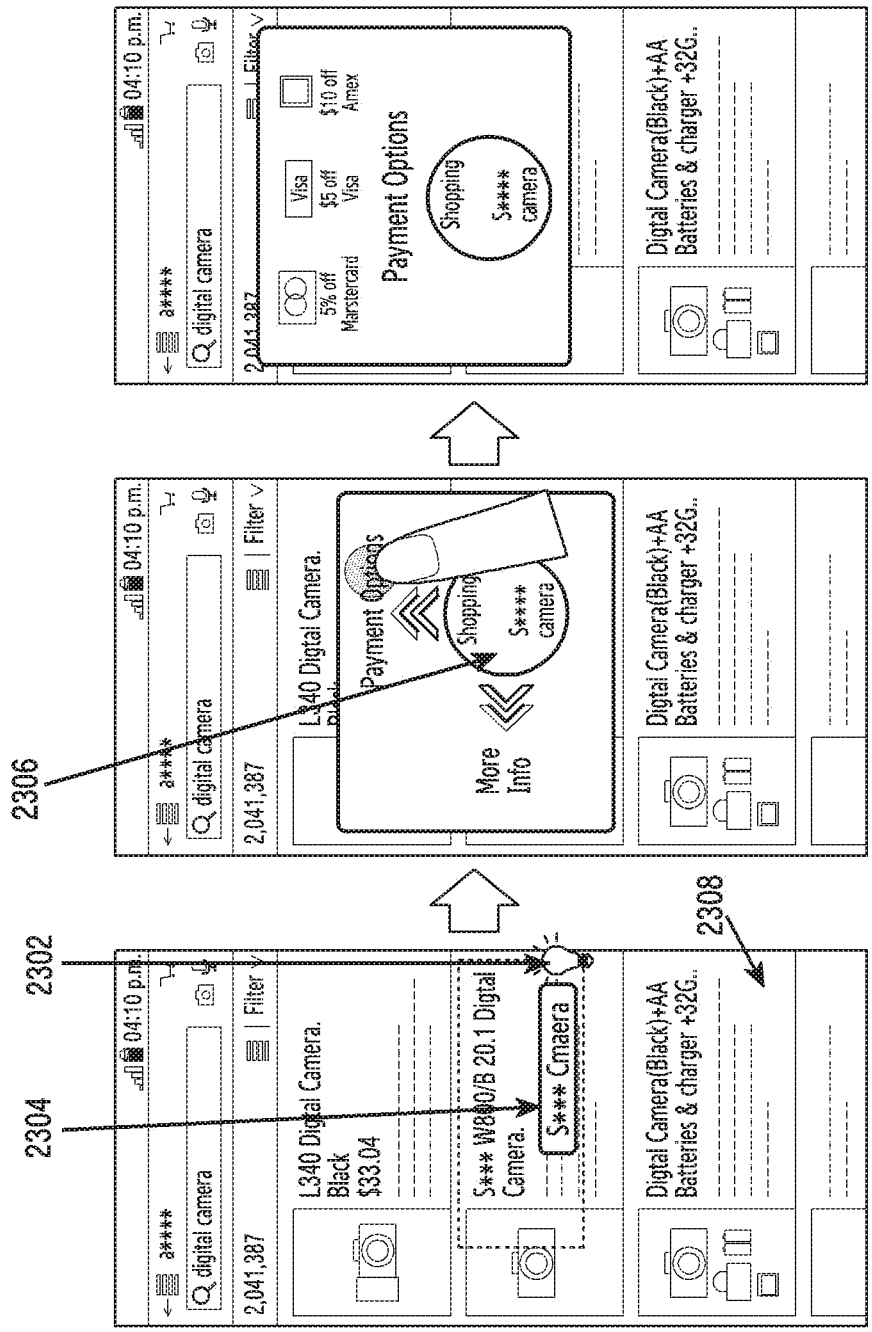
FIG. 23 is a schematic diagram illustrating a series of operations performed in creating a shopping entity using Bixby sub menu, according to an embodiment of the disclosure.

FIG. 23 is a schematic diagram illustrating a series of operations performed in creating a shopping entity using Bixby sub menu, according to an embodiment of the disclosure.

Consider that a user is searching for digital cameras on a shopping site such as Amazon. The user may invoke a bulb 2302 and drags the bulb 2302 on one search result being displayed on a mobile screen. The bulb 2302 detects the displayed search result as 'Sony camera' 2304 and visually indicates the detected 'Sony camera' 2304 to the user. When the user double taps on the bulb 2302, the bulb 2302 creates 'Sony camera' entity 2306. When the user selects the 'Sony camera' 2306, the bulb 2302 provides one or more options associated with the 'Sony camera'. As shown in FIG. 23, the bulb 2302 displays 'payment options' and 'more info' option. When the user selects 'payment' option, the bulb 2302 displays credit/debit card options for making the payment on a mobile screen.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating an electronic device, the method comprising:
   identifying one or more actionable items included in one or more selected regions comprising a plurality of contents, wherein the one or more selected regions are selected based on a user input;
   displaying the identified one or more actionable items, wherein a user can edit the one or more actionable items displayed in the electronic device;
   identifying at least one function based on an inter-relationship of the plurality of contents and the one or more actionable items; and
   displaying at least one application corresponding to the at least one function,
   wherein the inter-relationship is determined from a common factor found among the plurality of contents and the one or more actionable items.

2. The method of claim 1, wherein the plurality of contents comprise at least one of texts, numbers, symbols, images, or icons displayed on the display of the electronic device.

3. The method of claim 1, wherein the one or more actionable items comprise at least one of a phone number, an address, an email, an email id, a uniform resource locator (URL), a trade name, an account number, or an image within the plurality of contents.

4. The method of claim 1,
   wherein the user can deselect the one or more selected regions, and
   wherein the identified one or more actionable items are updated according to the deselection of the one or more selected regions.

5. The method of claim 1, wherein the user can edit, update or delete the one or more actionable items identified from the one or more selected regions.

6. The method of claim 1,
   wherein the user input is acquired by identifying a manipulation of an assistance item, and
   wherein the assistance item is activated by providing at least one of a touch gesture, a drag gesture, a double tap gesture, a voice command, or a long press gesture.

7. The method of claim 1, further comprising:
   providing one or more recommendations associated with the at least one application to the user for executing a task, wherein the one or more recommendations are provided based on a user preference, a past activity history and a planned future activity of the user.

8. The method of claim 1, further comprising:
storing the at least one application as one or more user actionable entities in the electronic device.

9. The method of claim 8, further comprising:
providing the one or more actionable items, application recommendations and user actionable entities to a user in a different language from an original entity and stored in a language independent format in the electronic device.

10. The method of claim 8, further comprising:
providing a user interface for viewing the stored one or more user actionable entities in the electronic device;
updating the stored one or more user actionable entities viewed in the user interface; and
activating at least one of the stored one or more user actionable entities by providing at least one of a voice command with keywords, an id of a stored entity, a category of the stored entity, or a selection menu.

11. The method of claim 1, further comprising:
extracting common or differential parameters from at least two or more of the actionable items, based on one or more of metadata, contents and properties associated with the at least two or more actionable items; and
generating a new user actionable entity based on the extracted common or differential parameters.

12. The method of claim 11, further comprising:
comparing one or more extracted common or differential parameters from at least two or more of the actionable items; and
generating a merged user actionable entity based on the comparison of the extracted common or differential parameters from the at least two or more actionable items.

13. The method of claim 11, further comprising:
recommending, by the user, two or more of the user actionable entities for merging,
wherein extracted common or differential parameters from at least two or more actionable items are compared to recommend the two or more of the user actionable entities to be merged.

14. The method of claim 1, wherein displaying at least one application corresponding to the at least one function comprises:
identifying the at least one application based on a mapping information on the at least one function and the at least one application stored in the electronic device, and rules identified from past user input.

15. An electronic device comprising:
a memory;
a user interface; and
at least one processor operably coupled to the memory, and configured to control the user interface to:
identify one or more actionable items included in one or more selected region comprising a plurality of contents, wherein the one or more selected regions are selected based on a user input,
display the one or more actionable items, wherein the user can edit the one or more actionable items displayed in the electronic device,
identify at least one function based on an inter-relationship of the plurality of contents and the one or more actionable items, and
display at least one application corresponding to the at least one function,
wherein the inter-relationship is determined from a common factor found among the plurality of contents and the one or more actionable items.

16. The electronic device of claim 15, wherein the user interface comprises at least one of:
a user actionable item detection module configured to capture the one or more actionable items present in the one or more selected regions,
a task creation module configured to create one or more tasks based on information associated with the one or more actionable items,
a task managing module configured to manage the one or more actionable items, or
an application recommendation module.

17. The electronic device of claim 15,
wherein the user can deselect one or more selected regions, and
wherein the identified one or more actionable items are updated according to the deselection of the one or more selected regions.

18. The electronic device of claim 15, wherein the user can edit, update or delete the one or more actionable items identified by the user from the one or more selected regions.

19. The electronic device of claim 15,
wherein the at least one processor is further configured to control the user interface to provide one or more recommendations associated with the at least one application for executing a task, and
wherein the one or more recommendations are provided based on a user preference, a past activity history and a planned future activity of the user.

20. The electronic device of claim 15, wherein the at least one processor is further configured to:
control the user interface to extract common or differential parameters from at least two or more of the actionable items, based on one or more of metadata, contents and properties associated with the at least two or more actionable items; and
generate a new user actionable entity based on the extracted common or differential parameters.

21. The electronic device of claim 20, wherein the one or more actionable items, application recommendations and user actionable entities are provided to a user in a different language from an original entity and stored in a language independent format in the electronic device.

* * * * *